(12) United States Patent
Imai

(10) Patent No.: US 7,649,027 B2
(45) Date of Patent: Jan. 19, 2010

(54) POLYMER AND PROCESS FOR PRODUCING POLYMER

(75) Inventor: Genji Imai, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 586 days.

(21) Appl. No.: 10/596,826

(22) PCT Filed: Dec. 24, 2004

(86) PCT No.: PCT/JP2004/019331

§ 371 (c)(1),
(2), (4) Date: Jun. 26, 2006

(87) PCT Pub. No.: WO2005/063838

PCT Pub. Date: Jul. 14, 2005

(65) Prior Publication Data

US 2009/0023830 A1     Jan. 22, 2009

(30) Foreign Application Priority Data

Dec. 26, 2003   (JP)  ............................... 2003-433797
Dec. 26, 2003   (JP)  ............................... 2003-434119

(51) Int. Cl.
*C08J 3/28* (2006.01)
*C08F 2/48* (2006.01)
*C08F 2/00* (2006.01)
*C08F 2/06* (2006.01)
*C08F 22/38* (2006.01)

(52) U.S. Cl. ............................. 522/81; 522/60; 522/62; 522/71; 522/74; 522/167; 522/164; 522/113; 522/134

(58) Field of Classification Search ................... 522/60, 522/62, 71, 74, 81, 167; 427/504, 510; 422/186, 422/186.3
See application file for complete search history.

(56) References Cited

U.S. PATENT DOCUMENTS

| 4,006,047 | A | 2/1977 | Brummnett et al. |
| 7,081,486 | B2 * | 7/2006 | Imai et al. ..................... 522/60 |
| 7,416,707 | B2 * | 8/2008 | Imai ........................... 422/186 |

FOREIGN PATENT DOCUMENTS

| JP | 05-117481 | 5/1993 |
| JP | 2000-251676 | 9/2000 |
| JP | 2001-87628 A | 4/2001 |
| JP | 2001-347162 A | 12/2001 |
| JP | 2002-145971 | 5/2002 |
| JP | 2003-71281 A | 3/2003 |
| JP | 2003-128409 | 5/2003 |
| JP | 2003-277987 | 10/2003 |
| WO | WO 2004/076498 A1 | 9/2004 |

* cited by examiner

*Primary Examiner*—Sanza L McClendon
(74) *Attorney, Agent, or Firm*—Knobbe Martens Olson & Bear LLP

(57) ABSTRACT

A process for producing a polymer, characterized in that a polymer having juts is produced by carrying out photopolymerization of at least one photopolymerizable polymerization precursor containing a photocurable compound having two or more unsaturated bonds by irradiation with active energy ray, optionally in the presence of at least one additive component for adding a polymer function, in a supercritical fluid or subcritical fluid; and a polymer having juts of 10 nm or more height, which height is 0.1-fold or more of the diameter of the juts, produced by the above process.

11 Claims, 5 Drawing Sheets

Fig. 4
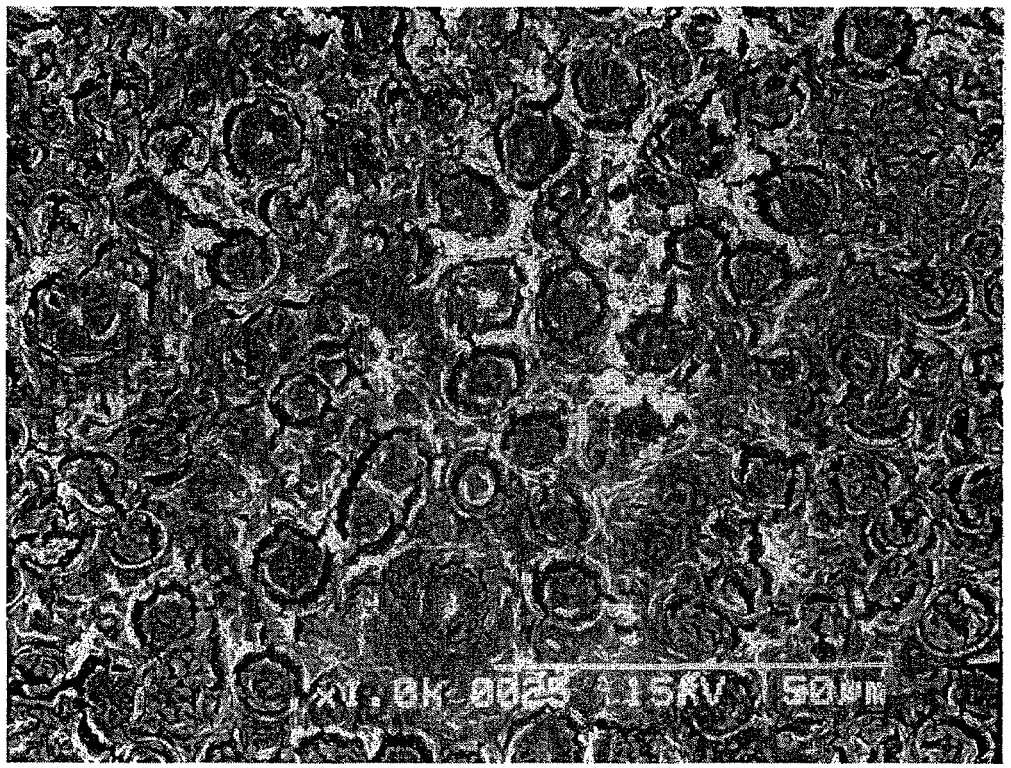
Fig.5 [図5]
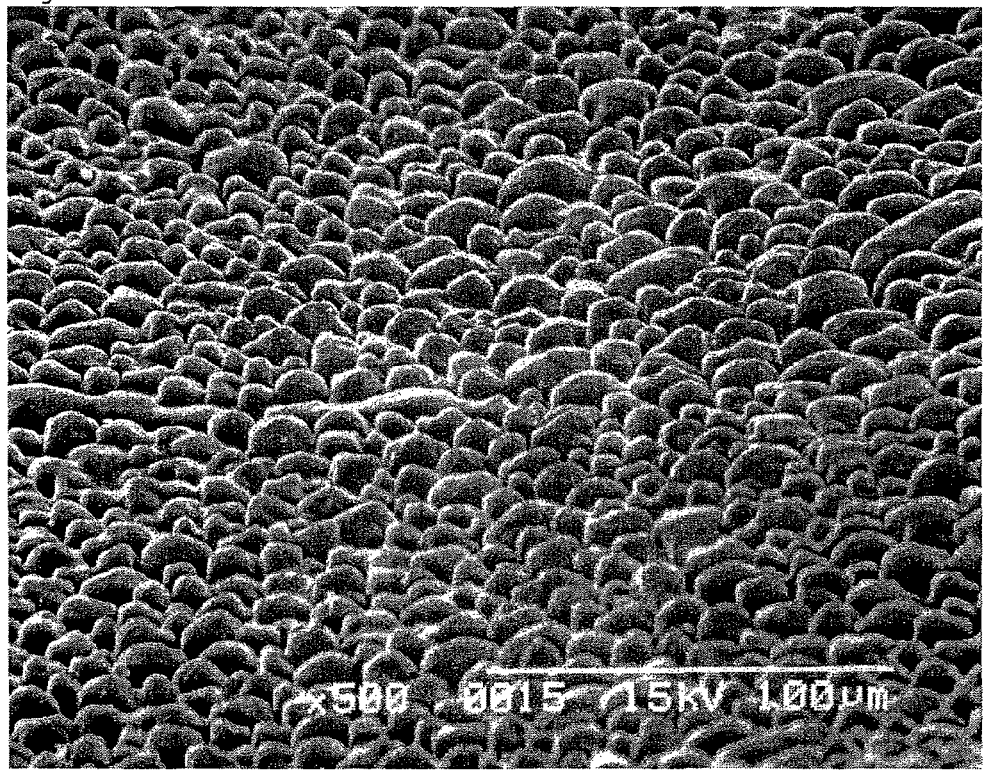

Fig. 6
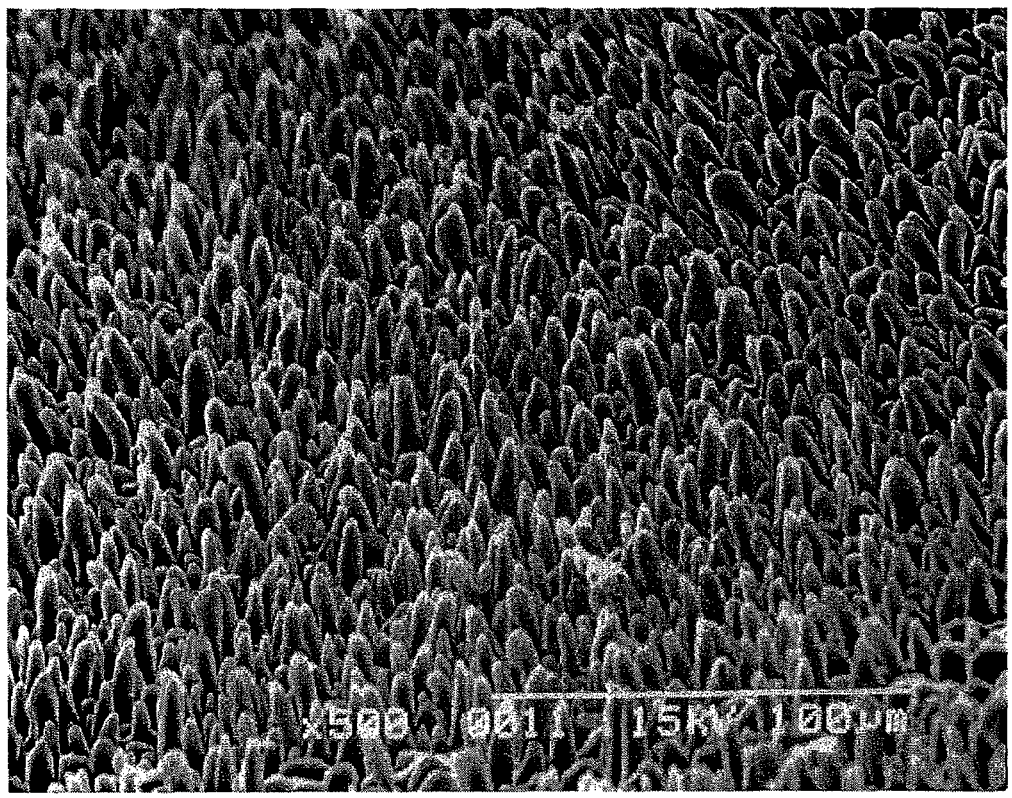
Fig. 7 [図7]
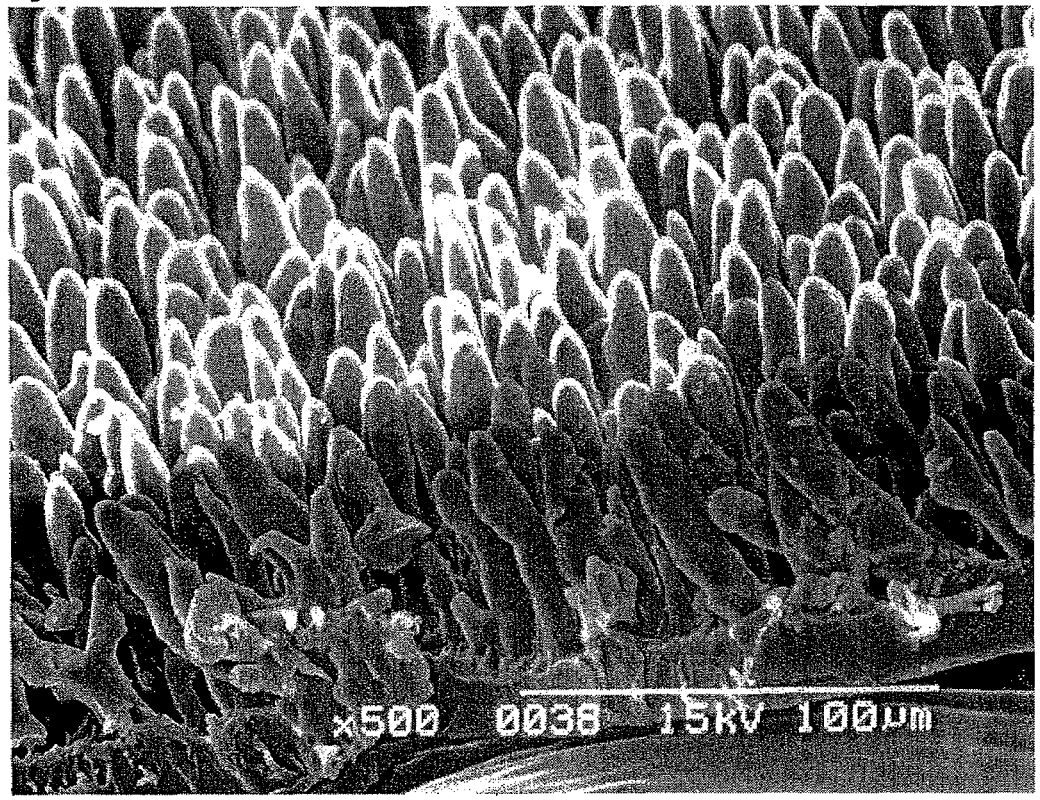

POLYMER AND PROCESS FOR PRODUCING POLYMER

This application is the U.S. National Phase under 35 U.S.C. §371 of International Application PCT/JP2004/019331, filed Dec. 24, 2004, which claims priority to Japanese Patent Application No. 2003-433797, filed Dec. 26, 2003 and No. 2003-434119, filed Dec. 26, 2003. The International Application was not published under PCT Article 21(2) in English.

TECHNICAL FIELD

The present invention relates to a polymer having juts (including also a so-called polymer brush) and a process for producing a polymer having juts, using a supercritical fluid or subcritical fluid. Further, the present invention relates to a structure containing a polymer having juts on a base material.

BACKGROUND ART

Recently, because of its peculiar shape, a polymer brush is paid to attention. The polymer brush has a structure in which a polymer chain of which end is fixed (by chemical bond or adsorption) to the surface of solid is extended along a direction vertical to the surface of solid. The degree of extending of a polymer chain depends significantly on graft density.

The polymer brush is obtained usually by grafting a polymer chain to the surface of solid by surface graft polymerization, particularly, surface initiation living radical polymerization.

For example, Japanese Patent Application Laid-Open (JP-A) No. 2001-131208 discloses a process of preparing a polymerizable brush base material comprising a process of providing a base material carrying at least one covalently bonded free radical initiator having a radical generating portion at a position distant from the base material, and a process of contacting the covalently bonded base material with a monomer, under conditions of promoting free radical polymerization from the radical generating portion of the initiator, to form a polymerizable brush.

JP-A No. 2002-145971 describes a process for producing a polymer brush by surface initiation living radical polymerization. The surface initiation living radical polymerization is specifically a method in which, first, a polymerization initiator is fixed by a Langmuir-Blodgett (LB) method or a chemical adsorption method to the surface of solid, then, a polymer chain (graft chain) is grown on the surface of solid by living radical polymerization (ATRP method). This publication describes that growth of a polymer chain of regulated length and length distribution on the surface of a substrate at high surface density conventionally not found is made possible by surface initiation living radical polymerization, and due to its high graft density, membrane thickness matching even elongated chain length is obtained by swelling with a solvent, realizing a condition of "polymer brush" in the true sense for the first time. This publication also describes that in conventional radical polymerization by surface initiation, a radical once generated grows until irreversible stopping to generate graft chains sequentially, thereby preventing adjacent grafting because of steric hindrance of a previously grown graft chain, while in this system, polymerization progresses in living mode, namely, all graft chains grow approximately evenly, thereby, steric hindrance between adjacent graft chains is decreased and, this is believed to be a factor for obtaining high graft density.

The above-mentioned JP-A No. 2002-145971 discloses a nano structure functional body characterized in that graft polymer chains constituting a graft polymer layer disposed on the surface of a substrate by graft polymerization obtained by such surface initiation living radical polymerization has a structure multi-layered in chemical composition along membrane thickness direction by copolymerization with other monomers or oligomers. Further, this publication discloses also a nano structure functional body characterized in that a polymerization initiation portion (polymerization initiation moiety) of molecules disposed on the surface of a substrate is inactivated in given pattern along membrane surface direction, then, a polymerization initiation portion not inactivated is graft-polymerized to give a graft polymer layer disposed in given pattern.

In addition, Tsujii Takanori, "Polymer Brush no Shintenkai", "Future Material", vol. 3, no. 2, p. 48 to 55 also describes in detail a high density (dense) polymer brush obtained by surface initiation living radical polymerization.

Regarding the polymer brush, applications to various uses have been investigated as described below.

The above-mentioned JP-A No. 2001-131208 describes that the resulting polymer brush is useful in solid phase synthesis of an array of peptides, polynucleotides or organic lower molecules.

The above-mentioned JP-A No. 2002-145971 describes that the disclosed nano structure functional body is useful as a complex particle, complex element, multi-functional sensor or the like showing responsibility against outer stimulation.

JP-A No. 2001-158813 describes application of a polymer brush to surface modification of a contact lens, intraocular lens, artificial cornea and the like. Further, this publication also describes application of a polymer brush to a dialyzer for kidney, blood reservoir bag, conductive wire of a pace maker, blood vessel transplant, bandage for injury therapy, eye patch, drug delivery patch, cardiac bulb, blood vessel for transplantation, catheter, artificial organ and Langerhans island.

Japanese Patent Application National Publication (Laid-Open) No. 2002-504842 describes application of a polymer brush to a stent.

Japanese Patent Application National Publication (Laid-Open) No. 2002-535450 describes application of a polymer brush to a nucleic acid molecule detecting method (DNA sensor and the like) and a method of purifying a compound such as nucleic acids, (poly)saccharides or (poly)peptides, or their complexes, antibodies and the like from a sample. Further, the above-mentioned publication describes also use of a polymer brush as an affinity matrix, its use as a sensor chip, its use for fixing of an initiation molecule for formation of an oligomer or polymer, preferably, for synthesis of a nucleic acid or peptide, and its use as a gel in separation of molecules, preferably, organism molecules, in electric field.

Though differing from a polymer brush, A. K. GEIM et al., "Microfabricated adhesive mimicking gecko food-hair", Nature materials, Vol. 2, July 2003, p. 461-463 describes a high density array of a polyimide in the form of pyramid (hair). Specifically, a polyimide film having a thickness of 5 µm is formed on a silicon base plate, and an aluminum pattern is transferred to the polyimide film by oxygen plasma etching using an aluminum mask, to form, for example, a polyimide array in the form of pyramid having a diameter of 0.6 µm and a height of 2.0 µm. This publication describes also that this has high stickiness.

These conventional polymer brushes are capable of having a structure of maximum elongation of a polymer chain (graft chain) only in a good solvent, and under dry condition or in a poor solvent, have a structure of a fallen or folded polymer chain (graft chain).

The supercritical fluid is a fluid of which density is near that of liquid and of which viscosity and diffusion coefficient are near those of gas, and has diffusibility of gas and substance dissolvability of liquid, together. That is, the supercritical fluid has various effects as a reaction solvent.

Conventionally, the supercritical fluid is utilized for separation by extraction of active ingredients, removal by extraction of unnecessary components, and the like such as extraction of hop extracts and aromatics, decaffeination from coffee and tobacco, and the like. For example, production of caffeine-less coffee utilizing supercritical carbon dioxide has been industrially carried out from approximately the latter half of the 1970's.

Recently, the supercritical fluid is utilized also for removal and concentration of impurities such as chemical raw materials, products and the like such as removal of unreacted monomers from a polymer, concentration and dehydration of alcohol, and the like. Further, the supercritical fluid is utilized also for de-bindering of ceramics, washing and drying of semiconductors and machine parts, and the like. For example, JP-A No. 7-149721 discloses a method of purifying a bismaleimide compound characterized in that an ether imide-based bismaleimide compound containing impurities such as aromatic hydrocarbon solvents and the like used in production is subjected to impurity extraction removal treatment of contacting with carbon dioxide under supercritical condition including a pressure of 60 atom or more and a temperature of 20° C. or higher or under condition near the supercritical condition.

Additionally, the supercritical fluid is utilized for fine particle formation, thin film formation and fine fiber formation by rapid expansion (RESS method) such as production of barba-like fine particles such as silica and the like, and also for fine particle formation and thin film formation by poor solvent achievement (GAS method) such as reinforcement (surface coating) of silica aero gel, and the like. For example, JP-A No. 8-104830 discloses a method of producing a fine particle for paint characterized in that a polymer polymerization reaction solution in a polymerization process for producing a polymer solid raw material for paint is dissolved in a supercritical phase using carbon dioxide and a polar organic solvent, and expanded rapidly.

Conventionally, polymers such as a fine particle for paint, and the like are produced by a solution polymerization method using a large amount of organic solvent, and the like from the standpoints of control of polymerization reaction speed, handling of a polymerization product, and the like. However, in the solution polymerization method, a polymer is produced in solution condition containing a solvent approximately in half amount, thus, a de-solventing process is necessary of removing a solvent from the resulting polymer solution and drying the polymer, after polymerization, leading to a complicated process. Treatment of an organic solvent vaporizing in the de-solventing process is also problematical.

In contrast, recently, there is a trial for producing a polymer using as a solvent a supercritical fluid, particularly, supercritical carbon dioxide. When supercritical carbon dioxide is used as a solvent, there is no necessity to effect removal of solvent and drying after polymerization, therefore, the process can be simplified and cost can be decreased. From the standpoint of no use of an organic solvent, environmental load is also small. Additionally, carbon dioxide can be easily recovered and recycled as compared with an organic solvent. Further, in many cases, there is a difference in solubility in carbon dioxide between a polymer and a monomer. As a result, when supercritical carbon dioxide is used as a solvent, the amount of unreacted monomers contained in a product polymer lowers, thus, a polymer of higher purity can be produced.

Regarding a method of producing a polymer using a supercritical fluid, Japanese Patent Application National Publication (Laid-Open) No. 7-505429, for example, discloses a method of producing a fluoro polymer containing a process of solubilizing a fluoro monomer in a solvent containing supercritical carbon dioxide and a process of thermally polymerizing a fluoro monomer in the solvent in the presence of a radical polymerization initiator, to produce a fluoro polymer.

JP-A No. 2000-26509 discloses a method of producing a fluoro polymer in which at least one fluorinated monomer is thermally polymerized in supercritical carbon dioxide using dimethyl(2,2'-azobisisobutyrate) as an initiator.

JP-A No. 2002-327003 discloses a method of producing a fluorinated alkyl group-containing polymer in which a radical-polymerizable monomer component containing a fluorinated alkyl group-containing (meth)acrylate in an amount of 20 wt % or more is thermally polymerized using supercritical carbon dioxide as a polymerization solvent.

JP-A No. 2001-151802 discloses a method of producing a polymer fine powder in which a monomer composition containing an ethylenically unsaturated monomer having a carboxyl group such as (meth)acrylic acid and the like is thermally radical-polymerized in supercritical carbon dioxide to give a polymer fine powder.

JP-A No. 2002-179707 discloses a method of producing a polymer fine particle in which a monomer such as methyl methacrylate and the like is thermally polymerized in supercritical carbon dioxide using a radical polymerization initiator which is a polymer having a specific structure substantially soluble in supercritical carbon dioxide.

JP-A No. 2002-128808 discloses a method of producing a polymer in which a polymerizable monomer such as methyl methacrylate, styrene and the like is thermally radical-polymerized in supercritical carbon dioxide in the presence of a specific non-polymerizable dispersing agent such as docosanoic acid, myristic acid and the like.

Kobayashi Masanori et al. "Dispersion polymerization of vinyl monomer using supercritical carbon dioxide" "Shikizai" vol. 75, No. 8, p. 371-377, 2002 describes dispersion polymerization of various acrylic monomers using, as a solvent, supercritical carbon dioxide and using, as a surfactant, poly(1,1,2,2-tetrahydroheptadecafluorodecyl acrylate) and poly(1,1,2,2-tetrahydroheptadecafluorodecyl methacrylate) obtained by a polymerization reaction using supercritical carbon dioxide as a solvent.

As described above, though polymer production methods of thermally polymerizing a monomer in a supercritical fluid such as supercritical carbon dioxide and the like have been previously investigated, there is known no method for producing a polymer in which a monomer is photo-polymerized in a supercritical fluid.

DISCLOSURE OF THE INVENTION

The present invention has an object of providing a polymer having juts of large height, which height is larger as compared with diameter. Further, the present invention has an object of providing a polymer having juts, containing an additive component for adding polymer functions. Still further, the present invention has an object of providing a method capable of simply producing such a polymer having juts.

The present invention is a process for producing a polymer, which comprises a step of carrying out photopolymerization of at least one photopolymerizable polymerization precursor containing a photocurable compound having two or more unsaturated bonds by irradiation with active energy ray in a supercritical fluid or sub-critical fluid to produce a polymer having juts.

Further, the present invention is a process for producing a polymer, which comprises a step of carrying out photopolymerization of at least one photopolymerizable polymerization precursor containing a photocurable compound having two or more unsaturated bonds by irradiation with active energy ray in a supercritical fluid or subcritical fluid in the presence of at least one additive component for adding a polymer function to produce a polymer having juts containing the additive component.

Further, the present invention is a polymer having juts wherein the height of juts is 0.1-fold or more of the diameter of the juts and the height of juts is 10 nm or more.

Further, the present invention is a polymer having juts, which contains at least one additive component for adding a polymer function.

Here, "polymer having juts" means a polymer in the form of projection or a polymer having one or more projections. In the case of a polymer in the form of projection, the polymer itself is called "jut", and in the case of a polymer having one or more projections, the projection is called "jut". "polymer having juts" includes also, but not limited to, a what is called polymer brush. For example, films or plates made of a polymer and having a plurality of projections on its surface, and projections themselves made of a polymer, are also included in the present invention.

When the diameters of juts (lengths of juts along a direction parallel to the surface of a base material) are not constant, the longest diameter at the bottom of juts (longer diameter or longer edge) is called diameter.

According to the method of the present invention, a polymer having juts of large length, which length is larger as compared with diameter, can be produced simply. In the resulting polymer having juts, for example, the height of the jut is 0.1-fold or more, further, 1-fold or more of diameter, and the height of a jut is 10 nm or more, further 1 μm or more. A polymer thus having juts of large length, which length is larger as compared with diameter, is not obtained conventional. When the method of the present invention is carried out in the present of at least one additive component for adding a polymer function, a polymer having juts containing the additive component can be produced easily.

In the present invention, the photopolymerizable polymerization precursor to be polymerized (hereinafter, referred to also as "polymerization precursor") and the additive component to be used according to necessity can be appropriately selected. By changing pressure and/or temperature in a polymerization reaction, the solubility of the polymerization initiator and the additive component in a solvent (supercritical fluid or subcritical fluid) can be changed, therefore, by controlling the polymerization pressure and polymerization temperature, the composition of the resulting polymer having juts can be controlled. Thus, according to the production method of the present invention, a polymer having juts having various physical properties and functions can be obtained.

Further, by changing the composition of the polymerization precursor to be polymerized and the additive component to be contained during polymerization, or by varying at least one of pressure and temperature during polymerization, and the like, it is possible to change the composition of the resulting polymer having juts along membrane thickness direction (direction vertical to the surface of a base material).

The polymer having juts of the present invention is expected to be applied to various uses typically including a conventional use of a polymer brush owing to its peculiar shape, and also expected to realize a novel functional structure.

For example, a polymer of the present invention in which the height of a jut is 0.1-fold or more of the diameter of a jut and the height of a jut is 10 nm or more shows high water-repellency irrespective of the composition of the polymer. Therefore, the polymer can impart water-repellency equivalent to that of a fluorine-based resin such as PTFE (polytetrafluoroethylene) and the like frequently used in water repellent finishing treatment.

Further, according to the method of the present invention, a polymer having juts can be formed on an active energy ray-permeable base material disposed so as to be exposed to a supercritical fluid or subcritical fluid. In particular, a polymerization precursor can be photo-polymerized by irradiation with active energy ray while permeating through an active energy ray-permeable base material so disposed that an incident surface of active energy ray is not exposed to a supercritical fluid or subcritical fluid and an exiting surface of active energy ray is exposed to a supercritical fluid or subcritical fluid, to form a polymer having juts on an active energy ray exiting surface of the active energy ray-permeable base material. Further, the base material can be irradiated with active energy ray via a mask pattern, to simply form a polymer having juts selectively on a part through which active energy ray has permeated. That is, a polymer having juts containing an additive component having a given fine pattern can be formed on the base material.

Furthermore, by calcining a polymer having juts of the present invention in which the additive component is at least one organometal complex, a membrane containing as a main component a metal and/or metal oxide having a specific fine structure (hereinafter, referred to also as "metal membrane") can also be formed simply in which the shape of the polymer having juts before calcination is approximately maintained.

Still further, by reducing a polymer having juts of the present invention in which the additive component is at least one organometal complex, the organometal complex can be converted into a metal, or depending on the kind of a metal, into a metal oxide, to simply form a polymer having juts containing a metal and/or metal oxide.

Figure 3:
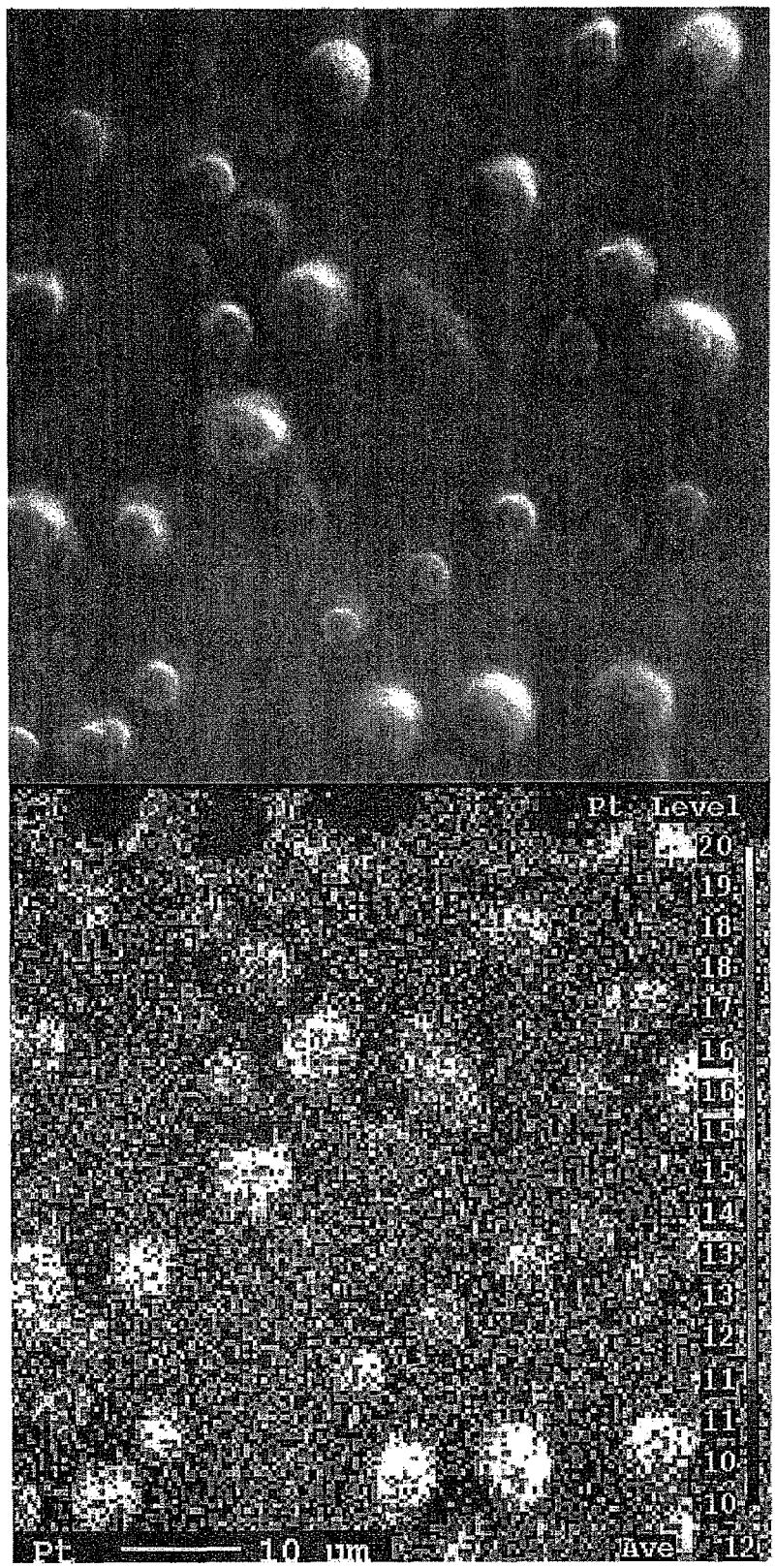

An upper photograph of FIG. 3 is a SEM photograph of the polymer having juts obtained in Example 1, and a lower photograph of FIG. 3 is a XMA Pt image of the polymer having juts obtained in Example 1.

FIG. 4 is a SEM photograph of the metal Pt membrane obtained in Example 1.

FIG. 5 is a SEM photograph of the polymer having juts obtained in Example 5.

FIG. 6 is a SEM photograph of the polymer having juts obtained in Example 6.

FIG. 7 is a SEM photograph of the polymer having juts obtained in Example 7.

Figure 8:
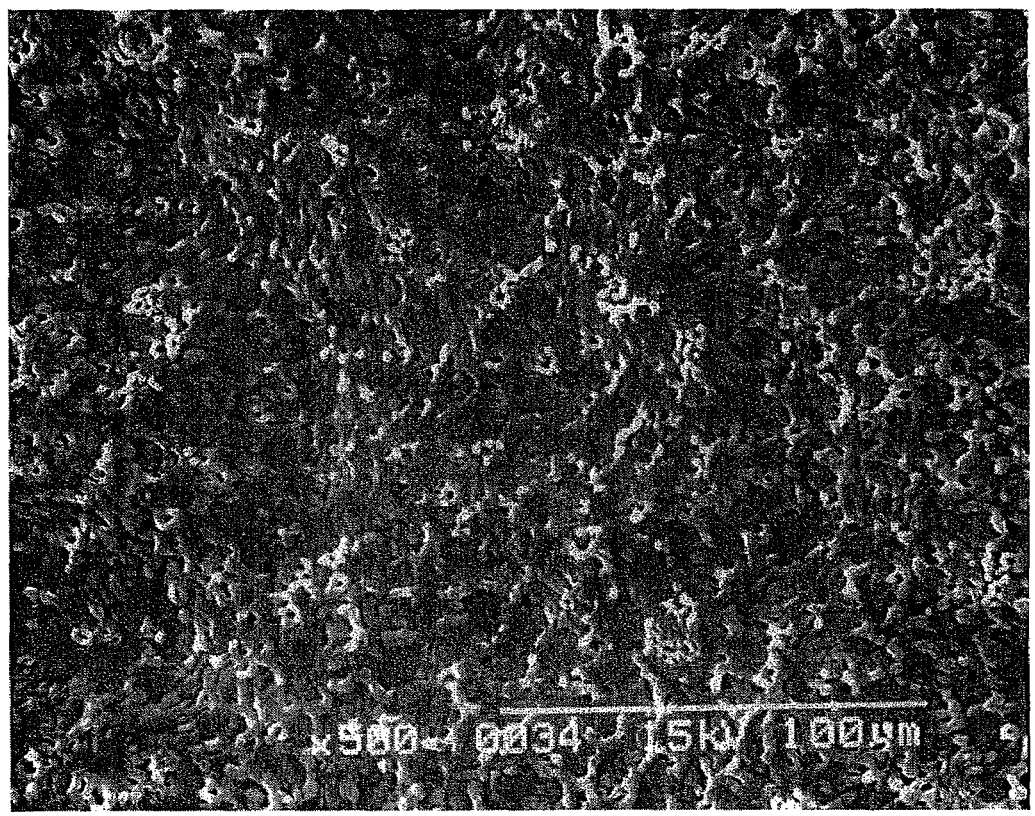

FIG. 8 is a SEM photograph of the polymer membrane obtained in Reference Example 1.

Figure 9:
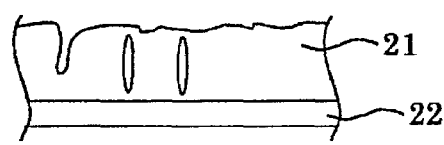

FIG. 9 is a schematic sectional view of the polymer membrane obtained in Reference Example 1.

BEST MODE FOR CARRYING OUT THE INVENTION

In the method of the present invention, a supercritical fluid or subcritical fluid is used as a polymerization solvent.

The supercritical fluid means a fluid under condition of both temperature and pressure over critical points, namely, under condition of over critical temperature and over critical pressure. The critical temperature and the critical pressure are values inherent in a substance. For example, carbon dioxide has a critical temperature of 30.9° C. and a critical pressure of 7.38 MPa. Methanol has a critical temperature of 239.4° C. and a critical pressure of 8.09 MPa. Water has a critical temperature of 374.1° C. and a critical pressure of 22.12 MPa. The subcritical fluid means a fluid manifesting the same action and effect as of the supercritical fluid, and having a temperature in Kelvin unit 0.65-fold or more of the critical temperature and a pressure 0.65-fold or more of the critical pressure.

The supercritical fluid or subcritical fluid can be appropriately selected depending on the solubility of a polymerization precursor, and the like. Examples of the supercritical fluid or subcritical fluid include carbon dioxide, water, methane, ethane, ethylene, propane, propylene, alcohols such as methanol and the like, ammonia, fron, carbon monoxide and the like. Further mentioned are inorganic gases such as nitrogen, helium, argon and the like. These supercritical fluids or subcritical fluids can also be used in admixture of two or more. Of them, supercritical carbon dioxide or subcritical carbon dioxide is preferable since supercritical condition or subcritical condition is obtained at relatively lower temperatures and lower pressures.

The use amount of the supercritical fluid or subcritical fluid can be appropriately determined depending on a polymerization precursor and reaction conditions and the like. For example, the charging concentration of a polymerization precursor can be about 1 wt % to 70 wt %.

In the present invention, a supercritical fluid or subcritical fluid is used as a reaction field, and other liquid or gas may be present.

In the present invention, a co-solvent (entrainer) helping dissolution of a solute polymerization precursor, additive component or photopolymerization initiator may be used for the purpose of enhancing the concentration of a polymerization precursor, or optional components, namely, an additive component and photopolymerization initiator in a supercritical fluid phase or subcritical fluid phase.

The entrainer can be appropriately selected depending on the supercritical fluid or subcritical fluid and the polymerization precursor and the like to be used. When supercritical carbon dioxide or subcritical carbon dioxide is used, examples of the entrainer include methanol, ethanol, propane, butane, hexane, octane, acetic acid, ethyl acetate, acetone, water, acetonitrile, dichloromethane and the like. The entrainer may be used singly or in combination. The use amount of the entrainer can be appropriately determined.

Pressure in the polymerization reaction (polymerization pressure) can be appropriately determined depending on the properties of a polymerization solvent, namely, a supercritical fluid or subcritical fluid and a polymerization precursor, intended polymer and the like. The polymerization pressure is preferably 0.65-fold or more of the critical pressure of a fluid, and more preferably the critical pressure or more. When supercritical carbon dioxide or subcritical carbon dioxide is used, the polymerization pressure is preferably 5 MPa or more, more preferably 7 MPa or more, and particularly preferably not lower than 7.4 MPa which is a critical pressure. When the polymerization pressure is within this range, the polymerization reaction progresses more successfully, and a polymer of higher quality is obtained. The upper limit of the polymerization pressure is not particularly restricted, and from the standpoint of the pressure-resistance of an apparatus and the like, it can be usually set in a range of 150 MPa or lower. The polymerization pressure may be kept constant from initiation until completion of polymerization, alternatively, the pressure may be subjected to variation during polymerization, such as increase in pressure or decrease in pressure with progress of polymerization.

Temperature in the polymerization reaction (polymerization temperature) can be appropriately determined depending on the properties of a polymerization solvent, namely, a supercritical fluid or subcritical fluid and a polymerization precursor, intended polymer and the like. The polymerization temperature is preferably 0.65-fold or more of the critical temperature of a fluid, and more preferably the critical pressure or more. When supercritical carbon dioxide or subcritical carbon dioxide is used, the polymerization temperature is preferably 20° C. or more, more preferably 30° C. or more, and particularly preferably not lower than 31° C. which is a critical temperature. When the polymerization temperature is within this range, the polymerization reaction progresses more successfully, and a polymer of higher quality is obtained. Though the upper limit of the polymerization temperature is not particularly restricted, it can be usually set in a range of 250° C. or lower. The polymerization temperature may be kept constant from initiation until completion of polymerization, alternatively, the temperature may be subjected to variation during polymerization.

Specifically, it is preferable to photopolymerize a polymerization precursor in carbon dioxide having a pressure of 5 MPa or more and a temperature of 20° C. or more, further, it is preferable to photopolymerize a polymerization precursor in carbon dioxide having a pressure of 7 MPa or more and a temperature of 30° C. or more.

The supercritical fluid or subcritical fluid can have density and polarity changed by pressure and temperature. By this, the solubility of a polymerization precursor and an optional component, additive component, in a solvent (supercritical fluid or subcritical fluid) can be changed. Therefore, for example, in the case of use of an additive component and in the case of use of two or more polymerization precursors, the composition of the resulting polymer can be controlled by controlling polymerization pressure and polymerization temperature. By varying at least one of pressure and temperature during polymerization, it is also possible to change the composition of the resulting polymer, for example, along a direction vertical to the surface of a base material.

In the method of the present invention, photopolymerization is carried out by irradiation with active energy ray in the presence of at least one polymerization precursor (monomer or the like), and if necessary, at least one additive component and a photopolymerization initiator, in the supercritical fluid or subcritical fluid as described above. Here, when only a polymerization precursor having one unsaturated bond is polymerized, a network structure is not formed and hardening does not occurs. For hardening, a polymerization precursor having two or more unsaturated bonds is necessary. Therefore, in the present invention, the polymerization precursor to be polymerized is allowed to contain at least one photopolymerizable compound which is a compound having two or more unsaturated bonds.

active energy ray used for irradiation can be appropriately determined depending on the polymerization precursor, photopolymerization initiator and the like. The active energy ray includes ultraviolet ray having wavelengths from 10 to 380 nm, visible ray having wavelengths from 380 to 780 nm, near infrared ray having wavelengths from 780 nm (0.78 μm) to 2.5 μm, and the like. In may cases, ultraviolet ray or visible ray having wavelengths of 500 nm or less, further, ultraviolet ray or visible ray having wavelengths of 420 nm or less, are used, and particularly, ultraviolet ray having wavelengths of 380 nm or less, further, ultraviolet ray having wavelengths of 330 nm or less, are used, as the active energy ray.

The active energy ray may not be a radiation having single wavelength or having one peak in its spectral distribution (emission distribution), and the active energy ray may have any spectral distribution providing light of the above-mentioned wavelength is contained.

As lamps (light source) used for irradiation with active energy ray, those which are generally used can be used, and examples thereof include an extra high pressure mercury lamp, high pressure mercury lamp, middle pressure mercury lamp, low pressure mercury lamp, chemical lamp, metal halide lamp, carbon arc lamp, xenon lamp, mercury-xenon lamp, tungsten lamp, hydrogen lamp, heavy hydrogen lamp, excimer lamp, short arc lamp, laser having oscillation line in UV laser (wavelength: 351 to 364 nm), helium-cadmium laser, argon laser excimer laser and the like.

The dose (accumulated light quantity) of active energy ray can be appropriately determined depending on the degree of polymerization of a given polymer, the height of a jut of a polymer having juts, and the like. The dose of active energy ray can be, for example, 0.5 mJ/cm$^2$ to 100 J/cm$^2$, and preferably, 1 mJ/cm$^2$ or more and 10 J/cm$^2$ or less.

The dose of active energy ray is defined as described below.

Dose (J/cm$^2$) of active energy ray=intensity of active energy ray (W/cm$^2$)×irradiation time (sec)

The dose of active energy ray can be controlled by irradiation time, lamp output and the like.

The intensity of active energy ray can be appropriately determined, and for example, can be 0.01 mW/cm$^2$ to 1 tera W/cm$^2$ (TW/cm$^2$). The irradiation time of active energy ray may be advantageously determined so as to obtain given irradiation amount according to its intensity.

In the present invention, a polymerization precursor and if necessary, an additive component and nano particles (ultrafine particles having an average particle size of, for example, 100 nm or less), are preferably dissolved and dispersed uniformly, then, irradiated with active energy ray to effect photopolymerization. Examples of the nano particles include nano carbon, CdSe and the like. By this, a polymer having juts in which an additive component and nano particles are uniformly dispersed can be produced. If necessary, other additives can also be compounded.

The polymerization precursor is not particularly restricted providing it is dissolved in a solvent supercritical fluid or subcritical fluid and it has photopolymerizability. The polymerization precursor can also be polymerized under condition of partial dissolution thereof in a supercritical fluid or subcritical fluid. The polymerization precursor may be a monomer, oligomer or polymer. As described above, in the present invention, a photopolymerizable compound which is a compound having two or more unsaturated bonds is used as the polymerization precursor. As the polymerization precursor, a polymerization precursor having one unsaturated bond can also be used together with a photopolymerizable compound.

Examples of the polymerization precursor include compounds having at least one group selected from the group consisting of a maleimide group optionally having a substituent, (meth)acryloyl group optionally having a substituent, cyclic ether structure optionally having a substituent, alkenyl group optionally having a substituent, vinylene group optionally having a substituent, and styryl group and azide group optionally having a substituent. Here, the (meth)acryloyl group means an acryloyl group and a methacryloyl group. When two or more of these groups are contained, only the same group may be contained, or different groups may be contained. The substituent is not particularly restricted providing it does not inhibit a polymerization reaction, and examples thereof include hydrocarbon groups having 12 or less carbon atoms, halogen atoms, amino groups, carboxyl group, hydroxyl group, cyano group and the like.

Preferable as the polymerization precursor are self-luminous polymerizable compounds which are compounds photopolymerizing in the absence of a photopolymerization initiator.

As the polymerization precursor which is a self luminous polymerizable compound, for example, maleimide-based compounds having at least two maleimide groups are preferable. Specifically mentioned are maleimide-based compounds of the following general formula (1).

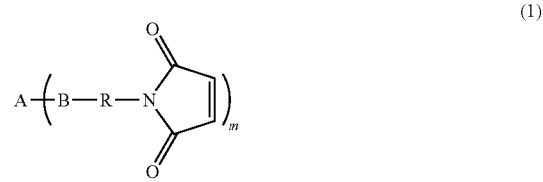

(1)

(wherein, A represents a hydrocarbon group optionally having a substituent, or a (poly)ether connecting chain or (poly)ether residue, (poly)ester connecting chain or (poly)ester residue, (poly)urethane connecting chain or (poly)urethane residue or (poly)carbonate connecting chain or (poly)carbonate residue having a molecular weight of 40 to 100000 obtained by connecting hydrocarbon groups optionally having a substituent via at least one bond selected from the group consisting of an ether bond, ester bond, urethane bond and carbonate bond. B represents an ether bond, ester bond, urethane bond or carbonate bond. R represents a hydrocarbon group optionally having a substituent. m represents an integer of 2 to 6. It is not necessary that Bs and Rs are all the same, and two or more different groups may be present in admixture.)

In the general formula (I), m is preferably an integer of 2 to 6 from the standpoint of formation of a hardened membrane from a single maleimide-based compound.

In the general formula (I), R is preferably an alkylene group, cycloalkylene group, arylalkylene group or cycloalkylalkylene group. Here, the alkylene group may be straight or branched. The arylalkylene group or cycloalkylalkylene group may have an aryl group or cycloalkyl group in the main chain, and may have an aryl group or cycloalkyl group in a branched chain. R is preferably a straight chain alkylene group having 1 to 5 carbon atoms or a branched alkylene group having 1 to 5 carbon atoms from the stand point of curability.

Specific examples of R in the general formula (1) include straight chain alkylene groups such as a methylene group, ethylene group, trimethylene group, tetramethylene group, pentamethylene group, hexamethylene group, heptamethylene group, octamethylene group, nonamethylene group, decamethylene group, undecamethylene group, dodecamethylene group and the like; branched alkylene groups such as a 1-methylethylene group, 1-methyl-trimethylene group, 2-methyl-trimethylene group, 1-methyl-tetramethylene group, 2-methyl-tetramethylene group, 1-methyl-pentamethylene group, 2-methyl-pentamethylene group, 3-methyl-pentamethylene group, neopentylene group and the like; cycloalkylene groups such as a cyclopentylene group, cyclohexylene group and the like; arylalkylene groups having an aryl group in the main chain or side chain such as a benzylene group, 2,2-diphenyl-trimethylene group, 1-phenyl-ethylene group, 1-phenyl-tetraethylene group, 2-phenyl-tetraethylene group and the like; cycloalkyl-alkylene groups having a cycloalkyl group in the main chain or side chain such as a cyclohexylmethylene group, 1-cyclohexyl-ethylene group, 1-cyclohexyl-tetraethylene group, 2-cyclohexyl-tetraethylene group and the like.

In the general formula (1), A represents a hydrocarbon group optionally having a substituent, or a (poly)ether connecting chain or (poly)ether residue (A-1), (poly)ester connecting chain or (poly)ester residue (A-2), (poly)urethane connecting chain or (poly)urethane residue (A-3) or (poly)carbonate connecting chain or (poly)carbonate residue (A-4) having a molecular weight of 40 to 100000 obtained by connecting hydrocarbon groups optionally having a substituent via at least one bond selected from the group consisting of an ether bond, ester bond, urethane bond and carbonate bond. A may also be connecting chain constituted of an oligomer or polymer containing repetition of these connecting chains as one unit of repetition.

When A in the general formula (1) is a hydrocarbon group optionally having a substituent, specific examples thereof include those hydrocarbon groups mentioned as specific examples of R.

Further, A in the general formula (1) includes;

(A-1) connecting chains or residues constituted of a (poly)ether (poly)ol having a molecular weight of 40 to 100000 having one unit or repeating units in which at least one hydrocarbon group selected from the group consisting of straight chain alkylene groups, branched alkylene groups, cycloalkylene groups and aryl groups is bonded by an ether bond;

(A-2-1) connecting chains or residues constituted of a (poly)ether (poly)ol having a molecular weight of 40 to 100000 having one unit or repeating units in which at least one hydrocarbon group selected from the group consisting of straight chain alkylene groups, branched alkylene groups, cycloalkylene groups and aryl groups is bonded by an ester bond;

(A-2-2) connecting chains or residues constituted of a (poly)carboxylic acid {(poly)ether (poly)ol}ester carrying a polycarboxylic acid residue at the end obtained by esterification of a di-, tri-, penta-, hexa-carboxylic acid (hereinafter, abbreviated as polycarboxylic acid) with a (poly)ether (poly)ol having a molecular weight of 40 to 100000 having one unit or repeating units in which at least one hydrocarbon group selected from the group consisting of straight chain alkylene groups, branched alkylene groups, cycloalkylene groups and aryl groups is bonded by an ether bond;

(A-2-3) connecting chains or residues constituted of a (poly)carboxylic acid {(poly)ester (poly)ol}ester carrying a polycarboxylic acid residue at the end obtained by esterification of a polycarboxylic acid with a (poly)ester (poly)ol having a molecular weight of 40 to 100000 having one unit or repeating units in which at least one hydrocarbon group selected from the group consisting of straight chain alkylene groups, branched alkylene groups, cycloalkylene groups and aryl groups is bonded by an ether bond and an ester bond;

(A-5) connecting chains or residues obtained by ring-opening of a (poly)epoxide having a molecular weight of 100 to 40000 having one unit or repeating units in which at least one hydrocarbon group selected from the group consisting of straight chain alkylene groups, branched alkylene groups, cycloalkylene groups and aryl groups is bonded by an ether bond;

(A-3-1) connecting chains or residues constituted of a (poly)ether (poly)isocyanate obtained by urethanization of an organic (poly)isocyanate with a (poly)ether (poly)ol having a molecular weight of 40 to 100000 having one unit or repeating units in which at least one hydrocarbon group selected from the group consisting of straight chain alkylene groups, branched alkylene groups, cycloalkylene groups and aryl groups is bonded by an ether bond;

(A-3-2) connecting chains or residues constituted of a (poly)ester (poly)isocyanate obtained by urethanization of an organic (poly)isocyanate with a (poly)ester (poly)ol having a molecular weight of 40 to 100000 having one unit or repeating units in which at least one hydrocarbon group selected from the group consisting of straight chain alkylene groups, branched alkylene groups, cycloalkylene groups and aryl groups is bonded by an ester bond;

(A-4) connecting chains or residues constituted of a carbonate of a (poly)ether (poly)ol having a molecular weight of 40 to 100000 having one unit or repeating units in which at least one hydrocarbon group selected from the group consisting of straight chain alkylene groups, branched alkylene groups, cycloalkylene groups and aryl groups is bonded by an ether bond; and the like.

(A-2-1), (A-2-2) and (A-2-3) are used as the (poly)ester connecting chain or (poly)ester residue (A-2) in the general formula (1). (A-3-1) and (A-3-2) are used as the (poly)urethane connecting chain of (poly)urethane residue (A-3) in the general formula (1).

Examples of the (poly)ether (poly)ol constituting the above-mentioned connecting chain or residue (A-1) include polyalkylene glycols such as polyethylene glycol, polypropylene glycol, polybutylene glycol, polytetramethylene glycol and the like; ethylene oxide modified substances, propylene oxide modified substances, butylene oxide modified substances or tetrahydrofuran modified substances of alkylene glycols such as ethylene glycol, propanediol, propylene glycol, tetramethylene glycol, pentamethylene glycol, hexanediol, neopentyl glycol, glycerin, trimethyllolpropane, pentaerythritol, diglycerin, ditrimethylolpropane, dipentaerythritol and the like. Of them, various modified substances of alkylene glycols are preferable. Further, as the (poly)ether (poly)ol constituting the above-mentioned connecting chain or residue (A-1), mentioned are copolymers of ethylene oxide and propylene oxide, copolymers of propylene oxide with tetrahydrofuran, copolymers of ethylene glycol with tetrahydrofuran; hydrocarbon-based polyols such as polyisoprene glycol, hydrogenated polyisoprene glycol, polybutadiene glycol, hydrogenated polybutadiene glycol and the like; poly-valent hydroxyl group compounds such as polytetramethylene hexaglyceryl ether (tetrahydrofuran modified substances of hexaglycerin) and the like.

Examples of the (poly)ester (poly)ol constituting the above-mentioned connecting chain or residue (A-2-1) include polyalkylene glycols such as polyethylene glycol, polypropylene glycol, polybutylene glycol, polytetramethylene glycol and the like, e-caprolactone modified substances, γ-butyrolactone modified substances, d-valerolactone modified substances or methylvalerolactone modified substances of alkylene glycols such as ethylene glycol, propanediol, propylene glycol, tetramethylene glycol, pentamethylene glycol, hexanediol, neopentyl glycol, glycerin, trimethylolpropane, pentaerythritol, diglycerin, ditrimethylolpropane, dipentaerythritol and the like; aliphatic polyester polyols as an esterified substance of an aliphatic dicarboxylic acid such as adipic acid, dimmer acid and the like with a polyol such as neopentyl glycol, methylpentanediol and the like; polyester polyols such as aromatic polyester polyols as an esterified substance of an aromatic dicarboxylic acid such as terephthalic acid with a polyol such as neopentyl glycol and the like; esterified substances of a poly-valent hydroxyl group compound such as polycarbonate polyol, acryl polyol, polytetramethylenehexaglyceryl ether (tetrahydrofuran modified substance of hexaglycerin) and the like with a dicarboxylic acid such as fumaric acid, phthalic acid, isophthalic acid, itaconic acid, adipic acid, sebacic acid, maleic acid and the like; poly-valent hydroxyl group-containing compounds such as monoglycerides obtained by a transesterification reaction of a poly-valent hydroxyl group-containing compound such as glycerin and the like with a fatty ester, and the like.

Examples of the (poly)carboxylic acid {(poly)ether (poly)ol}ester carrying a polycarboxylic acid at the end constituting the above-mentioned connecting chain or residue (A-2-2) include (poly)carboxylic acid {(poly)ether (poly)ol}esters carrying a polycarboxylic acid at the end obtained by esterification of a polycarboxylic acid such as succinic acid, adipic acid, phthalic acid, hexahydrophthalic acid, tetrahydrophthalic acid, fumaric acid, isophthalic acid, itaconic acid, adipic acid, sebacic acid, mateic acid, trimellitic acid, pyromellitic acid, benzenepentacarboxylic acid, benzenehexacarboxylic acid, citric acid, tetrahydrofurantetracarboxylic acid, cyclohexanetricarboxylic acid and the like with a (poly)ether (poly)ol shown in (A-1).

Examples of the (poly)carboxylic acid {(poly)ester (poly)ol}ester carrying a polycarboxylic acid at the end constituting the above-mentioned connecting chain or residue (A-2-3) include (poly)carboxylic acid {(poly)ester (poly)ol}esters carrying a polycarboxylic acid at the end obtained by esterification of a di-, tri-, penta-, hexa-carboxylic acid such as succinic acid, adipic acid, phthalic acid, hexahydrophthalic acid, tetrahydrophthalic acid, fumaric acid, isophthalic acid, itaconic acid, adipic acid, sebacic acid, maleic acid, trimellitic acid, pyromellitic acid, benzenepentacarboxylic acid, benzenehexacarboxylic acid, citric acid, tetrahydrofurantetracarboxylic acid, cyclohexanetricarboxylic acid and the like with a (poly)ester (poly)ol shown in (A-2).

Examples of the (poly)epoxide constituting the above-mentioned connecting chain or residue (A-5) include epoxy resins of epichlorohydrin modified bisphenol type synthesized from (methyl)epichlorohydrin and bisphenol A, bisphenol F, their ethylene oxide modified substance, propylene oxide modified substance and the like; epoxy resins of epichlorohydrin modified hydrogenated bisphenol type synthesized from (methyl)epichlorohydrin and hydrogenated bisphenol A, hydrogenated bisphenol F, their ethylene oxide modified substance, propylene oxide modified substance and the like; reaction products of phenol, bisphenol and the like with (methyl)epichlorohydrin; aromatic epoxy resins such as glycidyl esters of terephthalic acid, isophthalic acid or pyromellitic acid; polyglycidyl ethers of glycols such as (poly)ethylene glycol, (poly)propylene glycol, (poly)butylene glycol, (poly)tetramethylene glycol, neopentyl glycol and the like, and their alkylene oxide modified substances; glycidyl ethers of aliphatic polyhydric alcohols such as trimethylolpropane, trimethylolethane, glycerin, diglycerin, erythritol, pentaerythritol, sorbitol, 1,4-butanediol, 1,6-hexanediol and the like, and their alkylene oxide modified substances; glycidyl esters of carboxylic acids such as adipic acid, sebacic acid, maleic acid, itaconic acid and the like; glycidyl ethers of polyester polyols of polyhydric alcohols and polyvalent carboxylic acids; copolymers of glycidyl (meth)acrylate and methylglycidyl (meth)acrylate; aliphatic epoxy resins such as glycidyl esters of higher fatty acids, epoxidated linseed oil, epoxidated soy bean oil, epoxidated castor oil, epoxidated polybutadiene and the like.

Examples of the (poly)ether (poly)isocyanate constituting the above-mentioned connecting chain or residue (A-3) include aliphatic diisocyanate compounds such as methylene diisocyanate, hexamethylene diisocyanate, trimethylhexamethylene diisocyanate, tetramethylene diisocyanate, lysine diisocyanate, dimer acid diisocyanate and the like; aromatic diisocyanate compounds such as 2,4-tolyene diisocyanate, dimmer of 2,4-tolyene diisocyanate, 2,6-tolyene diisocyanate, p-xylene diisocyanate, m-xylene diisocyanate, 4,4'-diphenylmethane diisocyanate, 1,5-naphthylene diisocyanate, 3,3'-dimethylbiphenyl-4,4'-diisocyanate and the like; (poly)ether (poly)isocyanates obtained by a urethanization reaction of a polyisocyanate such as alicyclic diisocyanates such as isophorone diisocyanate, 4,4'-methylenebis(cyclohexyl isocyanate), methylcyclohexane-2,4-diisocyanate, methylcyclohexane-2,6-diisocyanate, 1,3-(isocyanatemethylene)cyclohexane and the like with a (poly)ether (poly)ol, and the like.

Examples of the (poly)ether (poly)ol used in the reaction with a polyisocyanate include polyalkylene glycols such as polyethylene glycol, polypropylene glycol, polybutylene glycol, polytetramethylene glycol and the like; ethylene oxide modified substances, propylene oxide modified substances, butylene oxide modified sub-stances or tetrahydrofuran modified substances of alkylene glycols such as ethylene glycol, propanediol, propylene glycol, tetramethylene glycol, pentamethylene glycol, hexanediol, neopentyl glycol, glycerin, trimethylolpropane, pentaerythritol, diglycerin, ditrimethylolpropane, dipentaerythritol and the like. Of them, various modified substances of alkylene glycols are preferable. Further, as the (poly)ether (poly)ol used in the reaction with a polyisocyanate, mentioned are copolymers of ethylene oxide and propylene oxide, copolymers of propylene oxide with tetrahydrofuran, copolymers of ethylene glycol with tetrahydrofuran; hydrocarbon-based polyols such as polyisoprene glycol, hydrogenated polyisoprene glycol, polybutadiene glycol, hydrogenated polybutadiene glycol and the like; poly-valent hydroxyl group compounds such as polytetramethylene hexaglyceryl ether (tetrahydrofuran modified substances of hexaglycerin) and the like.

Examples of the (poly)ester (poly)isocyanate constituting the above-mentioned connecting chain or residue (A-3-1) include (poly)ester (poly)isocyanates obtained by urethanization of a polyisocyanate mentioned for the connecting chain or residue (A-1) with a (poly)ester (poly)ol.

Examples of the (poly)ester (poly)ol used in the reaction with a polyisocyanate include ε-caprolactone modified substances, γ-butyrolactone modified substances, d-valerolactone modified substances or methylvalerolactone modified substances of alkylene glycols such as ethylene glycol, propanediol, propylene glycol, tetramethylene glycol, pentamethylene glycol, hexanediol, neopentyl glycol, glycerin, trimethylolpropane, pentaerythritol, diglycerin, ditrimethylolpropane, dipentaerythritol and the like; aliphatic polyester polyols as an esterified substance of an aliphatic dicarboxylic acid such as adipic acid, dimmer acid and the like with a polyol such as neopentyl glycol, methylpentanediol and the like; polyester polyols such as aromatic polyester polyols as an esterified substance of an aromatic dicarboxylic acid such as terephthalic acid with a polyol such as neopentyl glycol and the like; esterified substances of a poly-valent hydroxyl group compound such as polycarbonate polyol, acryl polyol, polytetramethylenehexaglyceryl ether (tetrahydrofuran modified substance of hexaglycerin) and the like with a dicarboxylic acid such as fumaric acid, phthalic acid, isophthalic acid, itaconic acid, adipic acid, sebacic acid, maleic acid and the like; poly-valent hydroxyl group-containing compounds such as monoglycerides obtained by a transesterification reaction of a poly-valent hydroxyl group-containing compound such as glycerin and the like with a fatty ester, and the like.

Examples of the (poly)ether (poly)ol constituting the above-mentioned connecting chain or residue (A-4) include (poly)ether (poly)ols mentioned for the connecting chain or residue (A-1).

The compound used for carbonation with a (poly)ether (poly)ol includes diethyl carbonate, dipropyl carbonate, phosgene and the like. Polycarbonation can be performed also by alternate polymerization of an epoxide with carbon dioxide.

Of them, preferable as A in the general formula (1) are (poly)ether connecting chains or (poly)ether residues (A-1) or (poly)ester connecting chains or (poly)ester residues (A-2) having a molecular weight of 100 to 100000 obtained by connecting at least one group selected from the group consisting of straight chain alkylene groups having 2 to 24 carbon atoms, branched alkylene groups having 2 to 24 carbon atoms, alkylene groups having 2 to 24 carbon atoms carrying a hydroxyl group, cycloalkylene groups, aryl groups and arylalkylene groups via at least one bond selected from the group consisting of an ether bond and an ester bond, and more preferable are (poly)ether connecting chains or (poly)ether residues (A-1) having a molecular weight of 100 to 100000 having a repeating unit containing a straight chain alkylene group having 2 to 24 carbon atoms, branched alkylene group having 2 to 24 carbon atoms, alkylene group having 2 to 24 carbon atoms carrying a hydroxyl group and/or aryl group or (poly)ester connecting chains or (poly)ester residues (A-2) having a molecular weight of 100 to 100000 having a repeating unit containing a straight chain alkylene group having 2 to 24 carbon atoms, branched alkylene group having 2 to 24 carbon atoms, alkylene group having 2 to 24 carbon atoms carrying a hydroxyl group and/or aryl group.

As the maleimide-based compound represented by the general formula (1), preferable are maleimide-based compounds in which R is an alkylene group having 1 to 5 carbon atoms, B is an ester bond represented by —COO— or —OCO—, and A is a (poly)ether connecting chain or (poly)ether residue (A-1) having a molecular weight of 100 to 1000 having a repeating unit containing a straight chain alkylene group having 2 to 6 carbon atoms, branched alkylene group having 2 to 6 carbon atoms or alkylene group having 2 to 6 carbon atoms carrying a hydroxyl group, from the standpoint of curability.

As such maleimide-based compounds, for example, polyether bismaleimide acetates of the following general formula (2) are mentioned.

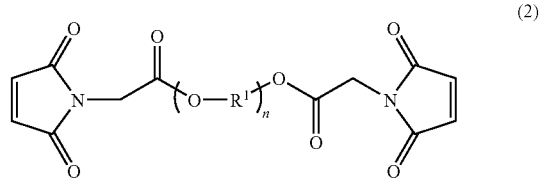

(wherein, $R^1$ represents an alkylene group and n represents an integer of 1 to 1000).

The maleimide-based compound of the general formula (1) can be synthesized, for example, by known methods from a maleimide-based compound having a carboxyl group and a compound reacting with a carboxyl group. Examples of the compound reacting with a carboxyl group include 2 to 6-functional polyols or polyepoxides having an average molecular weight of 100 to 1000000 having one unit or repeating units in which at least one hydrocarbon group selected from the group consisting of straight chain alkylene groups, branched alkylene groups, cycloalkylene groups and aryl groups is bonded by an ether bond and/or ester bond.

The maleimide-based compound of the general formula (1) can be synthesized by known methods from a maleimide-based compound having a carboxyl group and a compound reacting with a carboxyl group. Examples of the compound reacting with a carboxyl group include di-, tri-, penta-, hexacarboxylic acids, (poly)isocyanates, carbonates or phosgenes having 2 to 6 carboxyl groups, ether bonds or ester bonds in one molecule having an average molecular weight of 100 to 1000000 having one unit or repeating units in which at least one hydrocarbon group selected from the group consisting of straight chain alkylene groups, branched alkylene groups, cycloalkylene groups and aryl groups is bonded by an ether bond and/or ester bond.

The polymerization precursor includes, in addition, compounds as described below.

Examples of the compound having one maleimide group include methylmaleimide, hexylmaleimide, N-phenylmaleimide, N-(2-tert-butylphenyl)maleimide, N-(2-fluorophenyl)maleimide, N-(2-chlorophenyl)maleimide, N-(2-bromophenyl)maleimide, N-(2-iodophenyl)maleimide, N-cyclohexylmaleimide, N-laurylmaleimide, N,N'-methylenebis(N-phenyl)monomaleimide, hydroxymethylmaleimide, hydroxyethylmaleimide, 2-ethylcarbonate ethylmaleimide, 2-isopropylurethaneethylmaleimide, 2-acryloylethylmaleimide, acetoxyethylmaleimide, aminophenylmaleimide, N-(2-$CF_3$-phenyl)maleimide, N-(4-$CF_3$-phenyl)maleimide, N-(2-$CF_3$-phenyl)methylmaleimide, N-(2-bromo-3,5-$CF_3$-phenyl)maleimide, and the like.

Examples of the compound having two maleimide groups include N,N'-ethylenebismaleimide, N,N'-hexamethylenebismaleimide, N,N'-4,4'-biphenylbismaleimide, N,N'-3,3'-biphenylbismaleimide, N,N'-(4,4'-diphenylmethane) bismaleimide, N,N'-3,3-diphenylmethanebismaleimide, N,N'-4,4-diphenylmethanebismaleimide, N,N'-methylenebis(3-chloro-p-phenylene)bismaleimide, N,N'-4,4'-dicyclohexylmethanebismaleimide, N,N'-(2,2'-diethyl-6,6'-dimethyl-4,4'-methylenediphenylene)bismaleimide, N,N'-1,2-phenylenebismaleimide, N,N'-1,3-phenylenebismaleimide, N,N'-1,4-phenylenebismaleimide, 2,2'-bis(4-N-maleimidephenyl)propane, 2,2'-bis[4-(4-N-maleimidephenoxy)phenyl]propane, 2,2'-bis[3-tert-butyl-5-methyl-4-(4-maleimidephenoxy)phenyl]propane, 2,2'-bis(4-N-maleimide-2-methyl-5-ethylphenyl)propane, 2,2'-bis(4-N- maleimide-2,5-dibromophenyl)propane, bis(4-N-maleimidephenyl)methane, bis(3,5-dimethyl-4-maleimidephenyl)methane, bis(3-ethyl-5-methyl-4-maleimidephenyl)methane, bis(3,5-diethyl-4-maleimidephenyl)methane, bis(3-methyl-4-maleimidephenyl)methane, bis(3-ethyl-4-maleimidephenyl)methane, m-di-N-maleimidebenzene, 2,6-bis[2-(4-maleimidephenyl)propyl]benzene, N,N'-2,4-toluoylenebismaleimide, N,N'-2,6-toluoylenebismaleimide, N,N'-4,4-diphenyl ether bismaleimide, N,N'-3,3-diphenyl ether bismaleimide, N,N'-4,4-diphenylsulfide bismaleimide, N,N'-3,3-diphenylsulfide bismaleimide, N,N'-4,4-diphenylsulfone bismaleimide, N,N'-3,3-diphenylsulfone bismaleimide, N,N'-4,4-diphenylketone bismaleimide, N,N'-3,3-diphenylketone bismaleimide, N,N'-4,4-diphenyl-1,1-propanebismaleimide, N,N'-3,3-diphenyl-1,1-propanebismaleimide, 3,3'-dimethyl-N,N'-4,4-diphenylmethanebismaleimide, 3,3'-dimethyl-N,N'-4,4'-biphenylbismaleimide, 1,3-bis(3-maleimidephenoxybenzene, bis(4-maleimidephenyl)methane, bis[4-(3-maleimidephenoxy)phenyl]methane, 2,2-bis[4-(4-maleimidephenoxy)phenyl]methane, 1,1-bis[4-(4-maleimidephenoxy)phenyl]methane, 1,1-bis[3-methyl-4-(4-maleimidephenoxy)phenyl]methane, 1,1-bis[3-chloro-4-(4-maleimidephenoxy)phenyl]methane, 1,1-bis[3-bromo-4-(4-maleimidephenoxy)phenyl]methane, 1,1-bis[4-(3-maleimidephenoxy)phenyl]ethane, 1,2-bis-[4-(3-maleimidephenoxy)phenyl]ethane, 1,1-bis[4-(4-maleimidephenoxy)phenyl]ethane, 1,1-bis[3-methyl-4-(4-maleimidephenoxy)phenyl]ethane, 1,1-bis[3-chloro-4-(4-maleimidephenoxy)phenyl]ethane, 1,1-bis[3-bromo-4-(4-maleimidephenoxy)phenyl]ethane, 2,2-bis(4-maleimidephenyl)propane, 2,2-bis[4-(3-maleimidephenoxy)phenyl]propane, 2,2-bis[4-(4-maleimidephenoxy)phenyl]propane, 2,2-bis[3-chloro-4-(4-maleimidephenoxy)phenyl]propane, 2,2-bis[3-bromo-4-(4-maleimidephenoxy)phenyl]propane, 2,2-bis[3-ethyl-4-(4-maleimidephenoxy)phenyl]propane, 2,2-bis[3-propyl-4-(4-maleimidephenoxy)phenyl]propane, 2,2-bis[3-isopropyl-4-(4-maleimidephenoxy)phenyl]propane, 2,2-bis[3-butyl-4-(4-maleimidephenoxy)phenyl]propane, 2,2-bis[3-sec-butyl-4-(4-maleimidephenoxy)phenyl]propane, 2,2-bis[3-methoxy-4-(4-maleimidephenoxy)phenyl]propane, 1,1-bis[4-(4-maleimidephenoxy)phenyl]propane, 2,2-bis[4-(3-maleimidephenoxy)phenyl]butane, 3,3-bis[4-(4-maleimidephenoxy)phenyl]pentane, 4,4'-bis(3-maleimidephenoxy)biphenyl, bis[4-(3-maleimidephenoxy)phenyl]ketone, bis[4-(3-maleimidephenoxy)phenyl]sulfoxide, bis[4-(3-maleimidephenoxy)phenyl]sulfone, bis[4-(3-maleimidephenoxy)phenyl]ether, N,N'-p-benzophenonebismaleimide, N,N'-dodecamethylenebismaleimide, N,N'-m-xylylenebismaleimide, N,N'-p-xylylenebismaleimide, N,N'-1,3-bismethylenecyclohexanebismaleimide, N,N'-1,4-bismethylenecyclohexanebismaleimide, N,N'-2,4-tolylenebismaleimide, N,N'-2,6-tolylenebismaleimide, N,N'-diphenylethanebismaleimide, N,N'-diphenyl ether bismaleimide, N,N'-(methyleneditetrahydrophenyl)bismaleimide, N,N'-(3-ethyl)-4,4-diphenylmethanebismaleimide, N,N'-(3,3-dimethyl)-4,4-diphenylmethanebismaleimide, N,N'-(3,3-diethyl)-4,4-diphenylmethanebismaleimide, N,N'-(3,3-dichloro)-4,4-diphenylmethanebismaleimide, N,N'-tolidinebismaleimide, N,N'-isophoronebismaleimide, N,N'-p,p'-diphenyldimethylsilylbismaleimide, N,N'-benzophenonebismaleimide, N,N'-diphenylpropanebismaleimide, N,N'-naphthalenebismaleimide, N,N'-4,4-(1,1-diphenylcyclohexane)bismaleimide, N,N'-3,5-(1,2,4-triazole) bismaleimide, N,N'-pyridine-2,6-diylbismaleimide, N,N'-5-methoxy-1,3-phenylenebismaleimide, 1,2-bis(2-maleimideethoxy)ethane, 1,3-bis(3-maleimidepropoxy)propane, N,N'-4,4-diphenylmethanebis-dimethylmaleimide, N,N'-hexamethylene-bis-dimethylmaleimide, N,N'-4,4'-(diphenyl ether)-bis-dimethylmaleimide, N,N'-4,4'-(diphenylsulfone)-bis-dimethylmaleimide, triethylene glycol bis-carbonate bisethylmaleimide, isophoronebisurethanebisethylmaleimide, bisethylmaleimide carbonate, 4,9-dioxa-1,12-dodecanebismaleimide, bispropylmaleimide, dodecane-N,N'-bismaleimide, N-(2,4,6-isopropyl-3-maleimidephenyl)maleimide and the like.

Further, maleimide-based compounds obtained by a reaction of 3,4,4'-triaminodiphenylmethane, triaminophenol and the like with maleic anhydride, and maleimide-based compounds obtained by a reaction of tris-(4-aminophenyl)-phosphate or tris-(4-aminophenyl)-thiophosphate with maleic anhydride, are also mentioned.

Examples of the fluorine-containing bismaleimide-based compound include 2,2'-bis(4-maleimidephenyl)hexafluoropropane, 2,2'-bis[4-(3-maleimidephenoxy)phenyl]-1,1,1,3,3,3-hexafluoropropane, 2,2'-bis[4-(4-maleimidephenoxy)phenyl]-1,1,1,3,3,3-hexafluoropropane, 2,2'-bis[4-(4-maleimide-2-trifluoromethylphenoxy)phenyl]-1,1,1,3,3,3-hexafluoropropane, 2,2-bis[3,5-dimethyl-(4-maleimidephenoxy)phenyl]-1,1,1,3,3,3-hexafluoropropane, 2,2-bis[3,5-dibromo-(4-maleimidephenoxy)phenyl]-1,1,1,3,3,3-hexafluoropropane, 2,2'-bis[3-maleimide-5-(trifluoromethyl)phenyl]-1,1,1,3,3,3-hexafluoropropane, 2,2'-bis(3-fluoro-5-maleimidephenyl)-1,1,1,3,3,3-hexafluoropropane, 3,3'-bismaleimide-5,5'-bis(trifluoromethyl)biphenyl, 3,3'-difluoro-5,5'-bismaleimidebiphenyl, 3,3'-bismaleimide-5,5'-bis(trifluoromethyl)benzophenone, 3,3'-difluoro-5,5'-bismaleimidebenzophenone, 1,3-bis[3-maleimide-5-(trifluoromethyl)phenoxy]benzene, 1,4-bis[3-maleimide-5-(trifluoromethyl)phenoxy]benzene, 1,3-bis(3-fluoro-5-maleimidephenoxy)benzene, 1,4-bis(3-fluoro-5-maleimidephenoxy)benzene, 1,3-bis(3-fluorophenoxy)-5-fluorobenzene, 3,5-bis[3-maleimidephenoxy]benzotrifluoride, 3,5-bis[3-maleimide-5-(trifluoromethyl)phenoxy]benzotrifluoride, bis(3-fluoro-5-maleimidephenyl)ether, bis[3-maleimide-5-(trifluoromethyl)phenoxy]ether, bis(3-fluoro-5-maleimidephenyl)sulfide, bis[3-maleimide-5-(trifluoromethyl)phenyl]sulfide, bis(3-fluoro-5-maleimidephenyl)sulfone, bis[3-maleimide-5-(trifluoromethyl)phenyl]sulfide, 1,3-bis(3-fluoro-5-maleimidephenyl)-1,1,3,3-tetramethyldisiloxane, 1,3-bis[3-maleimide-5-(trifluoromethyl)phenyl]-1,1,3,3-tetramethyldisiloxane and the like.

As the maleimide-based compound, oligomers and polymers having at least one maleimide group are also mentioned.

The kind of this oligomer is not particularly restricted, and for example, those obtained by a Michael addition reaction of the above-mentioned maleimide-based compound and polyamines, and those obtained by a reaction of maleic acids and/or maleic anhydrides and a diamine, and the like are mentioned. Further, those obtained by a reaction of a polyimide precursor having an end anhydride group obtained by reacting tetracarboxylic dianhydride and diamine with a hydroxyl group-containing maleimide compound such as a maleimide compound as a reaction product of an epoxy resin and maleimide group-containing monocarboxylic acid, and those obtained by a reaction of a polyimide precursor having an end anhydride group obtained by reacting tetracarboxylic dianhydride and diamine, with a hydroxyl group-containing maleimide compound such as a maleimide compound as a reaction product of an epoxy resin and maleimide group-containing monocarboxylic acid, and with a polyol compound, and the like are mentioned.

Furthermore, also mentioned are compounds in which at least one maleimide group is bonded to polymer components or oligomer components such as a urethane-based resin, epoxy-based resin, polyester-based resin, polyether-based resin, alkyd-based resin, polyvinyl chloride-based resin, fluorine-based resin, silicone-based resin, vinyl acetate-based resin, phenol-based resin, polyamide resin and resins obtained by modifying two or more of these resins, and the like.

Examples of the compound having at least one (meth) acryloyl group include (meth)acrylates such as methyl (meth) acrylate, ethyl (meth)acrylate, propyl (meth)acrylate, butyl (meth)acrylate, hexyl (meth)acrylate, octyl (meth)acrylate, 2-ethylhexyl (meth)acrylate, decyl (meth)acrylate, dodecyl (meth)acrylate, lauryl (meth)acrylate, lauryl-tridecyl (meth) acrylate, tridecyl (meth)acrylate, cetyl-stearyl (meth)acrylate, stearyl (meth)acrylate, cyclohexyl (meth)acrylate, benzyl (meth)acrylate, phenyl (meth)acrylate and the like; (meth) acrylic amides such as (meth)acrylic amide, (meth)acrylic methylolamide and the like; reactive acrylic monomers such as (meth)acrylic acid, hydroxyethyl (meth)acrylate, hydroxypropyl (meth)acrylate, hydroxybutyl (meth)acrylate, dimethylaminoethyl (meth)acrylate, diethylaminoethyl (meth) acrylate, butylaminoethyl (meth)acrylate, glycidyl (meth) acrylate, tetrahydrofurfuryl (meth)acrylate and the like; cross-linkable acrylic monomers such as ethylene di(meth) acrylate, diethylene glycol di(meth)acrylate, triethylene glycol di(meth)acrylate, tetraethylene glycol di(meth)acrylate, decaethylene glycol di(meth)-acrylate, pentadecaethylene glycol di(meth)acrylate, pentacontahectaethylene glycol di(meth)acrylate, butylene di(meth)acrylate, allyl (meth) acrylate, trimethylolpropane tri(meth)acrylate, pentaerythritol tetra(meth)acrylate, diethylene glycol di(meth)acrylate phthalate, and the like; monofunctional (meth)acrylic compounds such as diethylene glycol-modified nonylphenol (meth)acrylate, isodecyl (meth)acrylate, lauryl (meth)acrylate, cetyl (meth)acrylate, stearyl (meth)acrylate, 2-(2-ethoxyethoxy)2-ethylhexyl (meth)acrylate and the like.

Additionally, examples of the compound having two or more (meth)acryloyl groups include 1,4-butanediol di(meth) acrylate, neopentyl glycol di(meth)acrylate, propylene oxide-modified neopentyl glycol di(meth)acrylate, hydroxypropionic acid neopentyl glycol di(meth)acrylate, hydroxypivalic acid neopentyl glycol di(meth)acrylate, 1,6-hexanediol di(meth)acrylate, 1,9-nonanediol di(meth)acrylate, tripropylene glycol di(meth)acrylate, polypropylene glycol di(meth)acrylate, trimethylolpropane tri(meth)acrylate, ethylene oxide-modified trimethylolpropane tri(meth)acrylate, propylene oxide-modified trimethylolpropane tri(meth)acrylate, propylene oxide-modified glycerin tri(meth)acrylate, pentaerythritol tri(meth)acrylate, pentaerythritol tetra(meth) acrylate, ditrimethylolpropane tetra(meth)acrylate, dipentaerythritol hexa(meth)acrylate, isocyanuric acid ethylene oxide-modified tri(meth)acrylate and the like.

Further mentioned are (meth)acrylates of diethylene glycol dicyclopentenyl monoether such a isobornyl (meth)acrylate, norbornyl (meth)acrylate, dicyclopentenoxyethyl (meth) acrylate, dicyclopentanoxypropyl (meth)acrylate and the like, (meth)acrylates of oligooxyethylene or oligopropylene glycol dicyclopentenyl monoether, and the like, dicyclopentenyl cinnamate, dicyclopentenoxyethyl cinnamate, dicylopentanocyethyl monofumarate or difumarate, and the like, mono-, di(meth)acrylates of 3,9-bis(1,1-bismethyl-2-oxyethyl)-spiro[5,5]undecane, 3,9-bis(1,1-bismethyl-2-oxyethyl)-2,4,8,10-tetraoxaspiro[5,5]undecane, 3,9-bis(2-oxyethyl)spiro[5,5]undecane, 3,9-bis(2-oxyethyl)-2,4,8,10-tetraoxaspiro[5,5]undecane and the like, or mono-, di-(meth) acrylates of ethylene oxide or propylene oxide addition polymers of these spiro glycols, or methyl ethers of these mono(meth)acrylates 1-azabicyclo[2,2,2]-3-octenyl (meth) acrylate, bicyclo[2,2,1]-5-heptene-2,3-dicarboxy monoallyl ester and the like, dicyclopentediethyl (meth)acrylate, dicyclopentadienyloxyethyl (meth)acrylate, dihydrodicyclopentadienyl (meth)acrylate and the like.

Also mentioned are oligomers and polymers having at least one (meth)acryloyl group.

The kind of this oligomer is not particularly restricted, and examples thereof include oligoethylene glycol, epoxy resin oligomer, polyester resin oligomer, polyamide resin oligomer, urethane resin oligomer, oligo vinyl alcohol, phenol resin oligomer and the like.

Specific examples thereof include acrylates of epoxy resin oligomers (for example, diglycidyl ether diacrylate of bisphenol A), reaction products of an epoxy resin oligomer, acrylic acid and methyltetrahydrophthalic anhydride, reaction products of an epoxy resin oligomer and 2-hydroxyethyl acrylate, reaction products of an epoxy resin oligomer, diglycidyl ether and diallylamine, ring-opening copolymer esters of glycidyl diacrylate and phthalic anhydride, esters of methacrylic acid dimmer and polyol, polyesters obtained from acrylic acid, phthalic anhydride and propylene oxide, reaction products of oligo ethylene glycol, maleic anhydride and glycidyl methacrylate, reaction products of oligo vinyl alcohol and N-methylolacrylamide, those obtained by esterifying oligo vinyl alcohol with succinic anhydride, then, adding glycidyl methacrylate, oligomers obtained by reacting p,p'-diaminodiphenyl to a diallyl esterified substance of pyromellitic dianhydride, reaction products of an ethylene-maleic anhydride copolymer and allylamine, reaction products of a methyl vinyl ether-maleic anhydride copolymer and 2-hydroxyethyl acrylate, those obtained by further reacting glycidyl methacrylate to them, urethane-based oligomers having an acryloyl group or methacryloyl group on both ends in which an oligooxyalkylene segment or saturated oligo ester segment or both of them are connected via a urethane bond, end acryl-modified isoprene rubber or butadiene rubber, and the like.

Specific examples of the oligomer having a (meth)acryloyl group include oligoethylene glycol di(meth)acrylate, nonylphenol EO-modified (meth)acrylate, oligopropylene glycol di(meth)acrylate, neopentyl glycol di(meth)acrylate, butylene glycol di(meth)acrylate, 1,6-hexanediol di(meth)acrylate, trimethylolpropane tri(meth)acrylate, pentaerythritol poly(meth)acrylate, bisphenol A diglycidyl ether di(meth) acrylate, oligo ester (meth)acrylate and the like.

Also mentioned are (meth)acryloyl group-containing silicone oligomers in which at least one (meth)acryloyl group or group containing a (meth)acryloyl group is bonded to at least one of end silicon atoms. Regarding the structure of a silicon oligomer itself, for example, mentioned are those containing at least one of an alkylsiloxane structure unit having 2 or more carbon atoms, arylsiloxane structure unit or aralkylsiloxane structure unit.

Furthermore, also mentioned are compounds in which at least one (meth)acryloyl group is bonded to polymer components or oligomer components such as a urethane-based resin, epoxy-based resin, polyester-based resin, polyether-based resin, alkyd-based resin, polyvinyl chloride-based resin, fluorine-based resin, silicone-based resin, vinyl acetate-based resin, phenol-based resin, polyamide resin and resins obtained by modifying two or more of these resins, and the like.

As the compound having at least one cyclic ether structure, mentioned are ring-containing ether compounds having at least one cyclic ether structure containing 2 to 12 carbon atoms and 1 to 6 oxygen atoms, particularly, a cross-linked structure containing —O—. More specifically, compounds having an epoxy ring such as a glycidyl group and the like are mentioned.

Examples of the compound having at least one cyclic ether structure include ethylene glycol diglycidyl ether, trimethylolpropane triglycidyl ether and the like.

Also mentioned are oligomers and polymers having at least one cyclic ether structure.

Examples of the oligomer having a cyclic ether structure include oligoethylene glycol diglycidyl ether and the like.

Further, also mentioned are compounds in which at least one group having such a cyclic ether structure is bonded to polymer components or oligomer components such as a urethane-based resin, epoxy-based resin, polyester-based resin, polyether-based resin, alkyd-based resin, polyvinyl chloride-based resin, fluorine-based resin, silicone-based resin, vinyl acetate-based resin, phenol-based resin, polyamide resin and resins obtained by modifying two or more of these resins, and the like.

The compound having at least one alkenyl group includes compounds having at least one vinyl group and/or allyl group. Examples of the compound having at least one alkenyl group include polyvinylcinnamates and the like.

Further, also mentioned are compounds in which at least one alkenyl group is bonded to polymer components or oligomer components such as a urethane-based resin, epoxy-based resin, polyester-based resin, polyether-based resin, alkyd-based resin, polyvinyl chloride-based resin, fluorine-based resin, silicone-based resin, vinyl acetate-based resin, phenol-based resin, polyamide resin and resins obtained by modifying two or more of these resins, and the like.

Examples of the compound having at least one vinylene group include compounds having an ethylenically unsaturated bond, unsaturated polyesters and the like. As the compound having at least one vinylene group, compounds having at least one cinnamyl group ($C_6H_5$—CH=CH—$CH_2$—) or cinnamylidene group ($C_6H_5$—CH=CH—CH=) are also mentioned. As such a compound, for example, polyvinyl cinnamate is mentioned. Polyvinyl cinnamate can be obtained, for example, by reacting polyvinyl alcohol with $C_6H_5$—CH=CH—$CH_2$—COCl.

Further, also mentioned are compounds in which at least one vinylene group is bonded to polymer components or oligomer components such as a urethane-based resin, epoxy-based resin, polyester-based resin, polyether-based resin, alkyd-based resin, polyvinyl chloride-based resin, fluorine-based resin, silicone-based resin, vinyl acetate-based resin, phenol-based resin, polyamide resin and resins obtained by modifying two or more of these resins, and the like.

Examples of the compound having at least one styryl group include styrene, a-methylstyrene, p-methylstyrene, a-methyl-p-methylstyrene, p-methoxystyrene, o-methoxystyrene, 2,4-dimethylstyrene, chlorostyrene, bromostyrene and the like. Also mentioned are polyvinylbenzalacetophenones, polyvinylstyrylpyridines and the like.

Further, also mentioned are compounds in which at least one styryl group is bonded to polymer components or oligomer components such as a urethane-based resin, epoxy-based resin, polyester-based resin, polyether-based resin, alkyd-based resin, polyvinyl chloride-based resin, fluorine-based resin, silicone-based resin, vinyl acetate-based resin, phenol-based resin, polyamide resin and resins obtained by modifying two or more of these resins, and the like.

Examples of the compound having at least one azide group include 2,6-bis(4-azidebenzylidene)chclohexanone, 2,6-bis(4'-azidebenzyl)methylcyclohexanone and the like.

Further, also mentioned are compounds in which at least one azide group is bonded to polymer components or oligomer components such as a urethane-based resin, epoxy-based resin, polyester-based resin, polyether-based resin, alkyd-based resin, polyvinyl chloride-based resin, fluorine-based resin, silicone-based resin, vinyl acetate-based resin, phenol-based resin, polyamide resin and resins obtained by modifying two or more of these resins, and the like.

The monomer copolymerizable with the monomers as described above includes cyano group-containing vinyl compounds such as acrylonitrile and methacrylonitrile and the like; halogen-containing vinyl compounds such as vinyl chloride and vinylidene chloride and the like; organic acid group-containing vinyl compounds such as vinyl acetate and vinyl propionate and the like; reactive monomers such as ethylene, maleic acid, itaconic acid and the like; acryl-modified silicones; cross-linkable copolymerization monomers such as chloroethyl vinyl ether, allyl glycidyl ether, ethylidenenorbornene, divinylbenzene, triallyl cyanurate, triallyl isocyanurate and the like.

The polymerization precursors as described above may be used singly or in combination of two or more.

It is also possible to vary the composition of the resulting polymer, for example, along a direction vertical to the surface of a base material by changing, during polymerization, the composition of a polymerization precursor to be polymerized.

In the production method of the present invention, the additive component for adding polymer functions is not particularly restricted, and may be an organic sub-stance or inorganic substance. The additive component to be used can be appropriately selected depending on the composition, physical properties and the like of a desired polymer. Examples of the functions to be added by the additive component include, but not limited to, adsorption function, separation function, catalytic function, medicinal function and the like.

The additive component is preferably a component performing photopolymerization under condition of partial dissolution thereof in a supercritical fluid or sub-critical fluid, and may also be a component performing photopolymerization under condition of dispersion thereof in a supercritical fluid or subcritical fluid.

As the additive component, for example, compounds (including also complex) containing a metal are mentioned. Examples of the compound containing a metal include those of the following general formula (3), those of the following general formula (4), those of the following general formula (5), those of the following general formula (6), those of the following general formula (7) and those of the following general formula (8).

$$M^1_p X^1_q \quad (3)$$

(wherein, $M^1$ represents a metal element, $X^1$ represents O, S, $SO_4$ or $PO_4$. p and q represent the ratio of $M^1$ to $X^1$, and determined by the valency of a metal element $M^1$. When two or more $X^1_s$ are present, it is not necessary that all $X^1_s$ are the same, and two or more kinds of moieties may be present in admixture.

$$M^2 X^2_t \quad (4)$$

(wherein, $M^2$ represent a metal element, and $X^2$ represents F, Cl, Br, I, CN, $NO_3$, $ClO_4$ or $NR^{O1}R^{O2}R^{O3}R^{O4}$ (wherein, $R^{O1}$, $R^{O2}$, $R^{O3}$ and $R^{O4}$ represent each independently hydrogen, hydrocarbon group or CF$_3$. R$^{01}$, R$^{02}$, R$^{03}$ and R$^{04}$ may be the same or different. R$^{01}$, R$^{02}$, R$^{03}$ and R$^{04}$ may also represent a poly-valent ligand such as phthalocyanine and the like.). t represents the ratio of M$^2$ to X$^2$, and determined by the valency of a metal element M$^2$. When two or more X$^2_s$ are present, it is not necessary that all X$^2_s$ are the same, and two or more kinds of moieties may be present in admixture.)

  (5)

(wherein, M$^3$ represents a metal element, R$^3$ represents hydrogen, hydrocarbon group or CF$_3$. i represents the ratio of M$^3$ to (OR$^3$), and determined by the valency of a metal element M$^3$. When two or more (OR$^3$)$_s$ are present, it is not necessary that all R$^3_s$ are the same, and two or more kinds of moieties may be present in admixture.)

  (6)

(wherein, M$^4$ represents a metal element, R$^4$ represents hydrogen, hydrocarbon group or CF$_3$. j represents the ratio of M$^4$ to (OCOR$^4$), and determined by the valency of a metal element M$^4$. When two or more (OCOR$^4$)$_s$ are present, it is not necessary that all R$^4_s$ are the same, and two or more kinds of moieties may be present in admixture.)

  (7)

(wherein, M$^5$ represents a metal element, R$^5$ represents hydrogen, hydrocarbon group or CF$_3$. k represents the ratio of M$^5$ to (OSO$_3$R$^5$), and determined by the valency of a metal element M$^5$. When two or more (OSO$_3$R$^5$)$_s$ are present, it is not necessary that all R$^5_s$ are the same, and two or more kinds of moieties may be present in admixture.)

  (8)

(wherein, M$^6$ represents a metal element, R$^6$ and R$^7$ represent each independently hydrogen, hydrocarbon group or CF$_3$. I represents the ratio of M$^6$ to (R$^6$COCH$_2$COR$^7$), and determined by the valency of a metal element M$^6$. When two or more (R$^6$COCH$_2$COR$^7$)$_s$ are present, it is not necessary that all R$^6_s$ and R$^7_s$ are the same, and two or more kinds of moieties may be present in admixture.)

p and q in the above-mentioned formula (3), t in the above-mentioned formula (4), i in the above-mentioned formula (5), j in the above-mentioned formula (6), k in the above-mentioned formula (7) and I in the above-mentioned formula (8) are determined by the valency of a metal element as described above and, for example, when M$^1$ in the above-mentioned formula (3) is an a-valent metal, then, (p,q)=(1,a/2), and when M$^2$ in the above-mentioned formula (4) is a b-valent metal, then, t=b.

M$^1$ in the above-mentioned formula (3), M$^2$ in the above-mentioned formula (4), M$^3$ in the above-mentioned formula (5), M$^4$ in the above-mentioned formula (6), M$^5$ in the above-mentioned formula (7) and M$^6$ in the above-mentioned formula (8) are not particularly restricted, and preferable are, for example, nickel (Ni), gold (Au), silver (Ag), copper (Cu), indium (In), palladium (Pd), platinum (Pt), tin (Sn), tungsten (W), aluminum (Al) and the like. M$^1$ in the above-mentioned formula (3), M$^2$ in the above-mentioned formula (4), M$^3$ in the above-mentioned formula (5), M$^4$ in the above-mentioned formula (6), M$^5$ in the above-mentioned formula (7) and M$^6$ in the above-mentioned formula (8) may be present in plural number. That is, an alloy composed of the above-mentioned metal elements may also be used.

In the above-mentioned formula (3), the above-mentioned formula (4), the above-mentioned formula (5), the above-mentioned formula (6), the above-mentioned formula (7) and the above-mentioned formula (8), the carbon number of a hydrocarbon group is not particularly restricted and preferably from 1 to 50. Examples of these hydrocarbon groups include a saturated aliphatic hydrocarbon group, unsaturated aliphatic hydrocarbon group, alicyclic hydrocarbon group, alicyclic-aliphatic hydrocarbon group, aromatic hydrocarbon group, aromatic-aliphatic hydrocarbon group, and the like. The aliphatic hydrocarbon group may be straight or branched.

Specific examples of the hydrocarbon group include a methyl group, ethyl group, n-propyl group, isopropyl group, n-butyl group, isobutyl group, tert-butyl group, n-pentyl group, isopentyl group, neopentyl group, tert-pentyl group, 2-methylbutyl group, n-hexyl group, isohexyl group, 3-methylpentyl group, ethylbutyl group, n-heptyl group, 2-methylhexyl group, n-octyl group, isooctyl group, tert-octyl group, 2-ethylhexyl group, 3-methylheptyl group, n-nonyl group, isononyl group, 1-methyloctyl group, ethylheptyl group, n-decyl group, 1-methylnoyl group, n-undecyl group, 1,1-dimethylnonyl group, n-dodecyl group, n-tetradecyl group, n-heptadecyl group, n-octadecyl group, further, groups composed of polymers of ethylene, propylene and butylenes or copolymers thereof, and the like.

The content of a metal contained in the above-mentioned metal compound, namely, p and q in the above-mentioned formula (3), t in the above-mentioned formula (4), i in the above-mentioned formula (5), j in the above-mentioned formula (6), k in the above-mentioned formula (7) and I in the above-mentioned formula (8) are not particularly restricted.

More specifically, examples of the additive component include organometal complexes such as organoplatinum, complex, organopalladium complex and the like.

The organoplatinum complex is not particularly restricted, and examples thereof include a platinum-alkyl complex, platinum-olefin complex, platinum-arene complex, platinum-phosphine complex, platinum-phosphite complex, and the like. Specific examples of the organoplatinum complex include Pt(COD)$_2$, Pt(COD)Me$_2$, Pt(COD)Et$_2$, Pt(CH$_2$=CH$_2$)$_2$Cl$_2$, Pt(CH$_2$=CH$_2$)$_2$(PPh$_3$), Pt(PPh$_3$)$_4$, Pt(PMe$_3$), Pt(PEt$_3$), Pt(PBu$_3$)$_4$, Pt[P(OPh)$_3$]$_4$, Pt[P(OMe)$_3$]$_4$, Pt[P(OEt)$_3$]$_4$, Pt[P(OBu)$_3$]$_4$, and the like. Wherein, COD represents 1,5-cyclooctadiene, Me represents methyl, Et represents ethyl, Bu represents butyl and Ph represents phenyl.

The organopalladium complex is not particularly restricted, and examples thereof include PdCl$_2$[P(Me)$_3$]$_4$, PdCl$_2$[PBu$_3$]$_2$, Pd(PPh$_3$)$_4$ and the like. Also mentioned are Pd$_3$(O$_2$CCH$_3$)$_6$, Pd(acac)$_2$ and the like. Wherein, acac represents acetylacetonato.

The organometal complex as the additive component include, additionally, an organoruthenium complex, organocobalt complex, organorhodium complex, or ganoiridium complex, organonickel complex, and the like. Also these complexes may have any ligands.

When an organometal complex is contained as the additive component, it is also possible to calcine the produced polymer having juts to metallize this. In this case, it is preferable to use an organometal complex carrying a hydrocarbon ligand as the additive component.

The additive component includes also organic compounds such as various medicinal components, for example, known blood circulation promoters, antiphlogistics, anti-inflammatory analgesics, antioxidants, antihistamines, antibacterial agents, antibiotics, steroids and the like.

The additive components includes also other resin components, rubber components, fillers, heat-resistant stabilizers, weather-proofing stabilizers, oxidation inhibitors, antistatic agents, flame retardants, slipping agents, anti-blocking agents, anti-fogging agents, lubricants, nucleating agents, dyes, pigments and the like.

The additive components for adding polymer functions as described above may be used singly or in combination of two or more.

It is also possible to vary the composition of the resulting polymer, for example, along a direction vertical to the surface of a base material by changing, during polymerization, the composition and amount of an additive component.

The use amount of the additive component for adding polymer functions can be appropriately determined depending on the composition and physical properties of a desired polymer. The use amount of the additive component can be, for example, about 0.001 to 100 parts by weight based on 100 parts by weight of a polymerization precursor to be polymerized. Usually, the use amount of the additive component is preferably 0.1 part by weight or more based on 100 parts by weight of a polymerization precursor to be polymerized, and preferably 50 parts by weight or less based on 100 parts by weight of a polymerization precursor to be polymerized.

When a polymerization precursor other than self luminous polymerizable compounds is polymerized, a photopolymerization initiator is necessary. The photopolymerization initiator is not particularly restricted providing it is dissolved in a supercritical fluid or a subcritical fluid or a polymerization precursor, and can be appropriately determined depending on the supercritical fluid or subcritical fluid or polymerization precursor to be used.

Examples of the photopolymerization initiator include azo-based initiators such as dialkyl(2,2'-azobisisobutyrates) such as dimethyl(2,2'-azobisisobutyrate), diethyl(2,2'-azobisisobutyrate) and the like, 2,2'-azobis(isobutyronitrile) (AIBN), 2,2'-azobis(2-methylbutyronitrile), 2,2'-azobis(2,4-dimethylvaleronitrile) and the like; peroxidebased initiators such as tert-butyl hydroperoxide, cumene hydroperoxide, tert-butyl peroxy neodecanate, tert-butyl peroxy pivalate, tert-hexyl peroxy-2-ethylhexanoate, methyl ethyl ketone peroxide, acetylcyclohexylsulfonyl peroxide, lauroyl peroxide, benzoyl peroxide and the like.

Other photopolymerization initiators include, for example, benzoin, benzoin alkyl ethers such as benzoin ethyl ether, benzoin n-propyl ether, benzoin isobutyl ether and the like; 2,2-dimethoxy-2-phenylacetophenone, 2-benzyl-2-dimethylamino-1-(4-morpholinophenyl)-butane-1-one, 1-hydroxycyclohexyl phenyl ketone, diacetyl, diphenyl sulfide, eosin, thionine, 9,10-anthraquinone, 2-ethyl-9,10-anthraquinone and the like.

The photopolymerization initiator includes, further, aromatic carbonyl compounds such as benzophenone, benzoin methyl ether, benzoin isopropyl ether, benzyl, xanthone, thioxanthone, anthraquinone and the like; acetophenones such as acetophenone, propiophenone, a-hydroxyisobutylphenone, a,a'-dichloro-4-phenoxyacetophenone, 1-hydroxy-1-cyclohexylacetophenone, acetophenone and the like; organic peroxides such as benzoyl peroxide, tert-butylperoxy benzoate, tert-butyl-peroxy-2-ethylhexanoate, tert-butyl hydroperoxide, di-tert-butyl peroxyisophthalate, 3,3',4, 4'-tetra(tert-butyl peroxycarbonyl)benzophenone and the like; diphenylhalonium salts such as diphenyl iodonium bromine, diphenyl iodonium chloride and the like; organic halides such as carbon tetrachloride, carbon tetrabromide, chloroform, iodoform and the like; heterocyclic or poly-cyclic compounds such as 3-phenyl-5-isooxazolone, 2,4,6-tris(trichloromethyl)-1,3,5-triazine benzanthrone and the like; azo compounds such as 1,1'-azobis(cyclohexane-1-carbonitrile) and the like; Iron-Arene Complex described in EU-Patent No. 152377; titanocene compounds described in JP-A No. 63-221110, and the like.

The photopolymerization initiator as described above may be used singly or in combination of two or more.

The use amount of the photopolymerization initiator can be, for example, about 0.1 to 30 parts by weight based on 100 parts by weight of a polymerization precursor.

If necessary, the above-mentioned photopolymerization initiator and photopolymerization initiation aid (sensitizer) can be used in combination. Examples of the photopolymerization initiation aid include 2-dimethylaminoethylbenzoate, N,N'-dimethylaminoethyl methacrylate, isoamyl p-dimethylaminobenzoate, ethyl p-dimethylaminobenzoate and the like.

In the present invention, it is possible to use a spectral sensitizer showing a mutual action property with a polymer to be produced and a photopolymerization initiator. Examples of the spectral sensitizer include thioxanthene, xanthene, ketone, thiopyrylium salt, base styryl, merocyanine, 3-substituted coumarin, cyanine, acridine and thiazine coloring matters, and the like. "Mutual action" herein referred to includes movement of energy and electrons from a exited spectral sensitizer to a polymer to be produced and/or a photopolymerization initiator, and the like.

Figure 1:
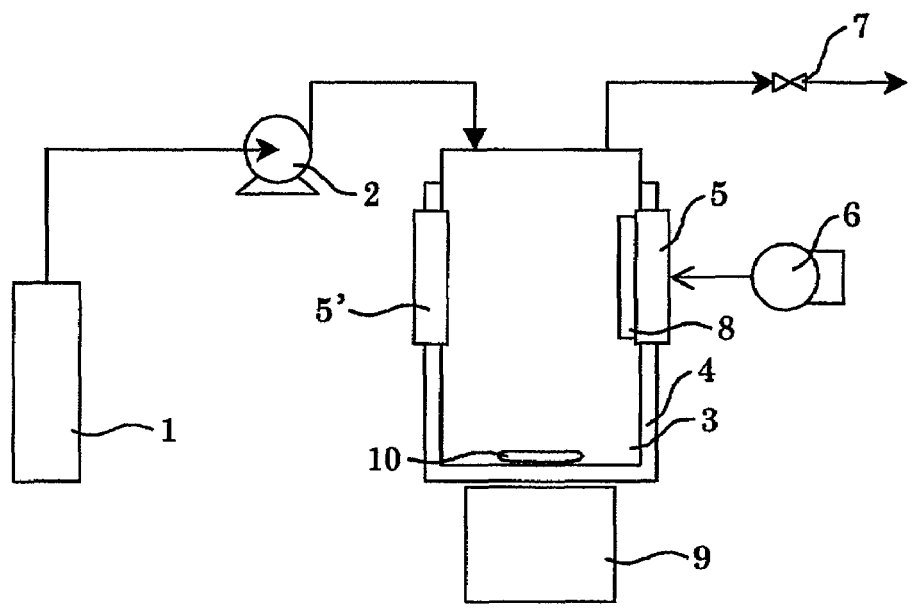
FIG. 1 is a schematic constitutional view of one example of a production apparatus used for carrying out the production method of the present invention.

Next, one embodiment of the method for producing a polymer of the present invention will be illustrated referring to drawings. FIG. 1 shows a schematic constitution view of one example of a production apparatus. 1 represents a carbon dioxide bomb, 2 represents a carbon dioxide feeding pump, 3 represents a reaction vessel capable of maintaining high temperature and high pressure condition, 4 represents a temperature control means, 5 represents a window for incidence of active energy ray (for example, quartz window), 5' represents a window (for example, quartz window), 6 represents a light source, 7 represents a pressure-reducing valve, 8 represents a base material for permeation of active energy ray (active energy ray permeable base material), 9 represents a magnetic stirrer, 10 represents a stirring member (rotor). The window 5' may not be provided.

The active energy ray permeable base material 8 is placed inside of the window 5 allowing permeation of active energy ray provided on the reaction vessel 3. The active energy ray permeable base material 8 is placed so that a surface at the side of the window 5 as an incidence surface of active energy ray is not exposed to supercritical carbon dioxide or subcritical carbon dioxide and an exiting surface of active energy ray is exposed to supercritical carbon dioxide or subcritical carbon dioxide. The active energy ray permeable base material 8 may not be placed so as to contact the window 5, and a member for disposition such as an active energy ray permeable film and the like can also be allowed to intervene.

A method of fixing the active energy ray permeable base material 8 is not particularly restricted, and mentioned are, for example, a method in which a window is provided at the bottom of a concave portion of a reaction vessel wall, and a base material is pushed into to be closely adhered to the window, a method of installing a base material on a window frame by a fastener, and other methods. It is also possible that a window is endowed with removable constitution and this window is itself used as a base material.

The base material is not particularly restricted providing it allows permeation of active energy ray, and mentioned are, for example, transparent resins or translucent resins, transparent or translucent glass, metal oxides such as ITO (indium-tin oxide) and the like, metals and the like. The material of the base material is selected taking the composition of a polymer to be formed, and the like into consideration. For example, when a bismaleimide-based polymer is formed, the polymer to be formed shows low close adherence and can be peeled easily providing the base material is quartz glass. On the other hand, when the base material is a PET (polyethylene terephthalate) film, a polymer of high close adherence is formed. For example, a base material coated with a coating material such as polyvinyl alcohol (PVA) and the like can also be used.

A base material made into any shape can be used. A polymerization precursor dissolved in a supercritical fluid or subcritical fluid is polymerized under condition of uniform distribution on the interface of the base material, to produced a polymer having juts. Therefore, a polymer having juts can be formed uniformly even on a base material having a fine irregular structure or a deep irregular structure.

The window 5 for incidence of active energy ray on which the base material 8 is placed, or a member for disposition placed thereon can have a shape determined depending on the shape of a base material on which a polymer having juts is formed or the shape of a desired polymer having juts.

After placing the active energy ray permeable base material 8 in the reaction vessel 3, a polymerization precursor and if necessary, an additive component and a photopolymerization initiator are placed in the reaction vessel 3. When the polymerization precursor and additive component are in the form of liquid, the polymerization precursor, additive component and photopolymerization initiator can also be fed from their storage vessels by a pump into the reaction vessel 3. When two or more polymerization precursors are used or a polymerization precursor and an additive component are used, they can be mixed previously before feeding to the reaction vessel 3, or they can be separately fed to the reaction vessel 3. The polymerization precursor, additive component and photopolymerization initiator can also be controlled at polymerization temperature previously by a heater before feeding to the reaction vessel 3.

On the other hand, carbon dioxide is fed from the carbon dioxide bomb 1 to the reaction vessel 3 by the pump 2. Carbon dioxide can also be controlled at polymerization temperature previously by a heater before feeding to the reaction vessel 3.

Pressure in the reaction vessel 3 is controlled at polymerization pressure by the amount of carbon dioxide to be fed. On the other hand, temperature in the reaction vessel 3 is controlled at polymerization temperature by the temperature control means 4 such as a heater and the like. Control of pressure in the reaction vessel 3 and control of temperature in the reaction vessel 3 can be conducted simultaneously, alternatively, either one can be controlled before controlling of another.

When a polymerization precursor controlled previously at polymerization temperature or higher temperatures by a heater and, if necessary, an additive component and carbon dioxide are fed to the reaction vessel 3, the temperature control means 4 such as a heater and the like may no be provided providing temperature in the reaction vessel 3 can be kept at polymerization temperature.

After attaining given pressure and temperature in the reaction vessel 3, active energy ray is irradiated from the light source 6 into the reaction vessel 3 through the active energy ray permeable window 5 and the base material 8 while stirring the content of the reaction vessel by the magnetic stirrer 9 and the stirring member 10, to cause a photopolymerization reaction, forming a polymer having juts on an active energy ray exiting surface of the active energy ray permeable base material. Irradiation with active energy ray may be carried out continuously or intermittently. It is possible to control the height of a jut on a polymer having juts to be formed by controlling the dose of active energy ray.

The polymer having juts to be formed by photopolymerization in the presence of an additive component contains the additive component selectively in the jut.

During polymerization, further, a polymerization precursor and/or an additive component can also be fed to the reaction vessel 3. By thus varying the composition of a polymerization precursor to be polymerized and an additive component, the composition of resulting polymer having juts can be changed along a direction vertical to the surface of a base material The stirring means used for stirring the content of a reaction vessel is not limited to the magnetic stirrer 9 and the stirring member 10.

According to the present invention, a polymer having juts can be formed selectively on a part on a base material through which active energy ray permeates. For example, by irradiation with active energy ray via a mask pattern, a polymer having juts having a desired pattern can be formed. In this case, for example, a mask pattern may be pasted on the outside of the window 5, or the shape itself of the window may be made into given pattern shape.

When laser beam is used as the light source, a light irradiation region can be narrowed as compared with other light sources, thus, a polymer having juts having a fine pattern can be formed. Further, when laser beam is used as the light source, light of higher intensity can be irradiated as compared with other light sources, thus, the aspect ratio (ratio of height to diameter of jut) and density of a jut on a polymer having juts can be controlled more easily.

After completion of the polymerization reaction, carbon dioxide is discharged from the pressure reducing valve 7, to decrease the pressure in the reaction vessel 3 down to about atmospheric pressure. For obtaining a polymer of higher purity by removing the unreacted polymerization precursor and the like, the pressure in the reaction vessel 3 may also be lowered to a pressure below atmospheric pressure, for example, to a vacuum of 133 Pa or less, before returning to about atmospheric pressure. After returning the temperature in the reaction vessel 3 to about normal temperature, the base material 8 carrying a formed polymer having juts is removed from the reaction vessel 3.

After completion of the polymerization reaction, high pressure under supercritical condition or subcritical condition can be lowered quickly or high temperature and high pressure can be lowered quickly, to foam the polymer produced. Since a supercritical fluid or subcritical fluid has a strong permeating force into a polymer and is uniform, a uniform porous body can be formed by performing such treatment.

In this procedure, the polymer cooling rate and the polymer pressure-reducing rate can be appropriately determined. By controlling the polymer cooling rate and the polymer pressure-reducing rate, pore diameter can be controlled. When the polymer cooling rate and the polymer pressure-reducing rate are larger, pore diameter tends to increase.

It may also be permissible that, after polymerization, a polymer is left if necessary in a supercritical fluid or subcritical fluid for given time, then, quick pressure reduction or quick cooling and quick pressure reduction is performed to foam the polymer.

The polymer having juts formed on the base material removed from the reaction vessel 3 can also be post-cured by irradiation with electromagnetic wave, irradiation with light or heating, or a combination thereof.

Carbon dioxide discharged from the reaction vessel 3 after completion of the polymerization reaction can be recovered and recycled.

The polymerization process above is shown in batch mode, however, the polymerization can be carried out also in continuous mode or semi-continuous mode.

The shape of the reaction vessel used for carrying out the method for producing a polymer of the present invention is not limited to that shown in FIG. 1. For example, it is also possible that an optical system such as an optical fiber and the like is inserted in the reaction vessel, and the content of the reaction vessel is irradiated with active energy ray through this optical system.

Figure 2:
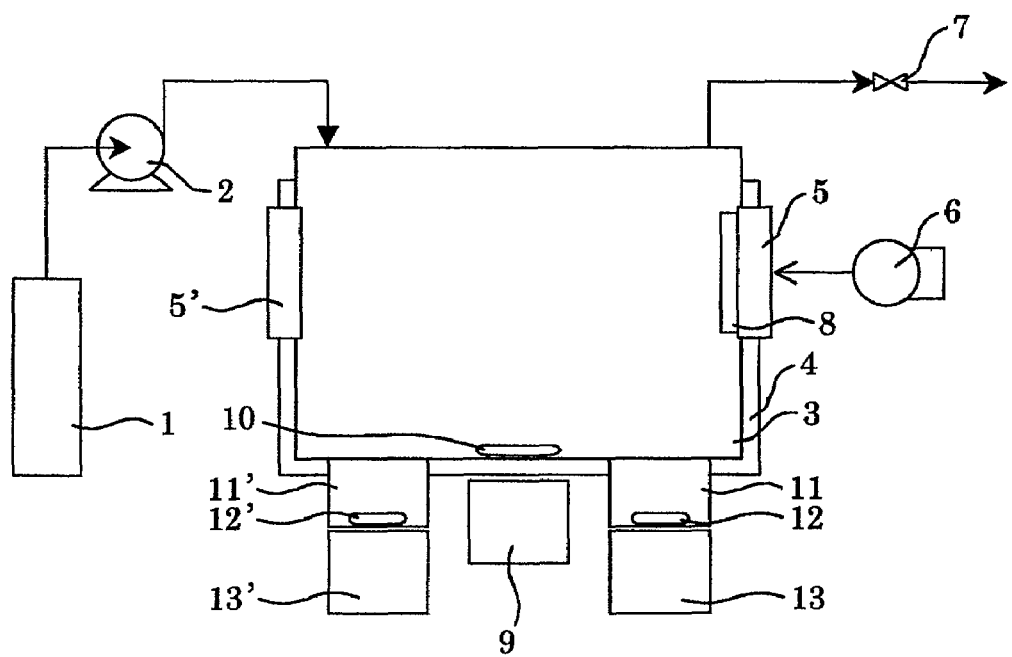
FIG. 2 is a schematic constitutional view of one example of a production apparatus used for carrying out the production method of the present invention.

FIG. 2 shows a schematic constitution view of another example of a production apparatus used for carrying out the production method of the present invention. 1 to 10 represent the same members as shown in FIG. 1. 11 and 11' represent a storage portion with an open-closeable lid for storing a polymerization precursor and/or additive component, 12 and 12' represent a stirring member (rotor), and 13 and 13' represent a magnetic stirrer. A window 5' may not be provided. If necessary, only one storage portion for a polymerization precursor and/or additive component may be provided, or three or more such storage portions may be provided.

The storage portions 11 and 11' for a polymerization precursor and/or additive component may have a temperature controlling means. The stirring means for stirring the content of the storage portions 11 and 11' is not limited to the magnetic stirrers 13, 13' and the stirring members 12, 12'. The storage portions 11 and 11' for a polymerization precursor and/or additive component may have no stirring means for stirring its content.

The production apparatus shown in FIG. 2 has the same constitution as the production apparatus shown in FIG. 1 except that the storage portions 11 and 11' with an open-closeable lid for storing a polymerization precursor and/or additive component, the stirring members 12 and 12' for stirring the content of the storage portions 11 and 11', and the magnetic stirrers 13 and 13' are provided.

When a polymer having juts is produced by the production apparatus shown in FIG. 2, all of a polymerization precursor to be polymerized, and an additive component and a photopolymerization initiator used if necessary are not charged in the reaction vessel 3, a part of them or all of them are charged in the storage portions 11 and 11'. In the storage portions 11 and 11', one kind of polymerization precursor or additive component may be charged, or two or more polymerization precursors and/or additive components may be charged in admixture.

Before initiation of polymerization or during polymerization, if necessary, the lid of the storage portion is opened, and a polymerization precursor and/or additive component stored inside is fed to the reaction vessel 3. By this, the amount and composition of a polymerization precursor and additive component present in the reaction vessel 3 can be controlled easily during polymerization. The polymerization precursor and/or additive component can also be controlled at polymerization temperature previously by a heater before feeding to the reaction vessel 3.

A polymer having juts can be produced by the same manner as in the case of producing a polymer by the production apparatus shown in FIG. 1 described above, excepting the above-mentioned procedure.

The storage portions 11 and 11' for a polymerization precursor and/or additive component may be equipped with no lid providing they have a constitution in which a polymerization precursor and/or additive component stored inside can be fed to the reaction system only when required. For example, when the polymerization precursor and/or additive component to be stored is not dissolved or dispersed in a supercritical fluid or a subcritical fluid unless higher temperature is prepared, it may be permissible that the storage portion is not equipped with a lid and a heating means for heating the storage portion is provided.

The production apparatus shown in FIG. 2 is used particularly suitably when the composition of the resulting polymer having juts is changed along a direction vertical to the surface of a base material by varying the composition of a polymerization precursor to be polymerized and an additive component to be contained.

Thus, the polymer having juts of the present invention can be produced. In the present invention, a polymer grows along the irradiation direction with active energy ray, to form a jut of the polymer. Namely, usually, a polymer grows along a direction vertical to the surface of a base material, to form a jut of the polymer. Usually, when the irradiation time with active energy ray (polymerization time) is longer, the produced polymer tends to form a continuous membrane made of the polymer having juts.

According to the present invention, a polymer having juts of which height is 0.1-fold or more of its diameter, further, a polymer having juts of which height is 1-fold or more of its diameter, further, a polymer having juts of which height is 2-fold or more of its diameter, further, a polymer having juts of which height is 3-fold or more of its diameter, further, a polymer having juts of which height is 5-fold or more of its diameter, can be produced. The upper limit of the ratio of the height to the diameter of a jut is not particularly restricted, and for example, the height of a jut can be 50-fold or more of the diameter.

According to the present invention, a polymer having juts of which height is 10 nm or more, further, a polymer having juts of which height is 0.5 μm or more, further, a polymer having juts of which height is 1 μm or more, further, a polymer having juts of which height is 5 μm or more, further, a polymer having juts of which height is 10 μm or more, further, a polymer having juts of which height is 30 μm or more, further, a polymer having juts of which height is 50 μm or more, can be produced. The upper limit of the height of a jut is not particularly restricted, for example, the height of a jut can be 500 μm.

The height of a jut of a polymer can be controlled by the dose (accumulated light quantity) of active energy ray. The height of a jut of a polymer is in approximate proportion to the dose of active energy ray, and when the dose of active energy ray reaches constant quantity or more, the height of a jut of a polymer does not increase more, and interval between juts tends to become smaller to form a continuous membrane.

Particularly, according to the present invention, a polymer having juts of which height is 0.1-fold or more of its diameter and of which height is 10 nm or more, further, a polymer having juts of which height is 1-fold or more of its diameter and of which height is 1 μm or more, further, a polymer having juts of which height is 5-fold or more of its diameter and of which height is 50 μm or more, can be produced. A polymer having juts of which height is larger as compared with diameter and of which height is larger as described above cannot conventionally be obtained by polymerizing a polymerization precursor such as a monomer and the like.

The surface density of a jut of a polymer having juts is not particularly restricted, and according to the present invention, for example, a polymer having juts of which surface density is as high as $0.01/nm^2$ or more, further, $0.1/nm^2$ or more can be formed on a base material. The density of a jut of a polymer having juts can also be lowered, and the surface density of a jut can be, for example, $0.001/\mu m^2$.

Here, when the polymer having juts is a polymer in the form of projection, the surface density of a jut means the density of a polymer in the form of projection on the surface of a base material.

According to the present invention, a polymer having juts can be formed on a base material together with the polymerization. The polymerization precursor to be polymerized and additive component can be appropriately selected, and in addition, the resulting polymer having juts contains a jut of which height is larger as compared with diameter and of which height is larger.

As described above, a polymer having juts to be formed can be easily peeled from a base material depending on the base material to be selected, therefore, for example, it can also be obtained as a resin film having at least one projection containing at least one additive component.

Further, in the present invention, it is also possible to change the composition of the resulting polymer having juts along a direction vertical to the surface of a base material by varying the composition of a polymerization precursor to be polymerized and an additive component to be contained or by varying at least one of pressure and temperature during polymerization.

As described above, according to the present invention, for example, a polymer having juts containing various additive components can be obtained. Additionally, the resulting polymer having juts contains a jut of which height is larger as compared with diameter and of which height is larger. Further, a polymer having juts of which composition varies along a direction vertical to the surface of a base material can also be obtained.

Thus, according to the present invention, a polymer having juts having various physical properties and functions can be obtained. The polymer having juts of the present invention is, particularly because of its peculiar form, expected to be applied to various uses, and a novel functional structure is also expected to be realized.

For example, a polymer having juts containing an organopalladium complex as the additive component can be used for electroless plating of Ni and the like. The combination of an additive component (organometal complex) and a metal to be plated is not limited to a combination of an organopalladium complex and Ni, and appropriately determined.

Further, for example, a drug in the form of particle can be produced by using various medicinal components as the additive component.

Further, the polymer having juts of the present invention can be applied to artificial organs such as artificial kidney, artificial lung and the like, and plasma purifying materials and the like by appropriately selecting a polymerization precursor to be polymerized and if necessary, an additive component, utilizing its peculiar form.

A polymer having juts containing an organometal complex such as an organoplatinum complex and the like as the additive component can also be calcined for metallization, to form a metal membrane having a specific fine structure (including also metal oxide membrane). The metal membrane after calcination maintains approximately the shape of the polymer having juts containing an organometal complex before calcination, and has a porous structure.

The calcination conditions for forming a metal membrane can be appropriately determined depending on the kind of an organometal complex as the additive component, and the like. For example, a metal membrane can be formed by calcining a polymer having juts containing an organometal complex in an oxygen-containing gas such as air and the like at 250 to 2000° C. for 5 minutes to 48 hours. Usually, the calcination temperature is preferably 300° C. or more, and preferably 1700° C. or less. On the other hand, the calcination time is preferably 10 minutes or more and preferably 5 hours or less.

Thus obtained metal membrane is also be expected to be applied to various uses. For example, a titanium oxide membrane, or a membrane composed of titanium oxide and a noble metal such as platinum and the like, obtained by the pre-sent invention, is expected to be used as a photo-catalyst of high activity, particularly, as a photo-catalyst of high activity for purifying environments.

Further, a polymer having juts containing a metal and/or metal oxide can also be formed by reducing a polymer having juts containing an organometal complex such as an organoplatinum complex, organopalladium complex and the like as the additive component to convert the organometal complex into a metal, and depending on the metal, into a metal oxide.

The reducing treatment method and reducing treatment conditions for forming a polymer having juts containing a metal and/or metal oxide are not particularly restricted, and can be appropriately determined depending on the kind of an organometal complex as the additive component.

Examples of the reducing treatment method include a method in which a polymer having juts containing an organometal complex is immersed in a solution containing a reducing agent, a method in which a polymer having juts containing an organometal complex is allowed to contact a reducing gas to cause gas phase reduction, and other methods.

In the method of immersing a polymer having juts containing an organometal complex into a solution containing a reducing agent, the reducing agent to be used is not particularly restricted providing it can reduce an organometal complex as the additive component into a metal or a metal oxide. Examples of the reducing agent include sodium borohydride, potassium borohydride, dimethylamineborane (DMAB), trimethylamineborane (TMAB), hydrazine, formaldehyde, derivatives of these compounds, sulfites such as sodium sulfite, hypophosphites such as sodium hypophosphite and the like. As the reducing agent, also mentioned are ferrous salts such as $FeSO_4$ and the like, metal hydrogen phosphates such as sodium hypophosphite and the like, hydroxylamine sulfate, hydrosulfite and the like.

The solvent containing a reducing agent is usually an aqueous solution, and the solvent for dissolving a reducing agent is not limited to water. Examples of the solvent for dissolving a reducing agent include methanol, ethanol, ethyl ether, hexane, benzene, methylene chloride, diglyme (diethylene glycol dimethyl ether), tetrahydrofuran, dimethylacetamide, dimethyl sulfoxide, acetonitrile and the like.

The concentration of a reducing agent in a solution containing the reducing agent is usually about 0.003 to 0.1 mol/liter. When the concentration of a reducing agent in a solution containing the reducing agent is 0.003 mol/liter or more, the speed of the reducing reaction becomes sufficiently large. The concentration of a reducing agent in a solution containing the reducing agent is preferably 0.005 mol/liter or more. On the other hand, when the concentration of a reducing agent in a solution containing the reducing agent 0.1 mol/liter or less, falling of the deposited metal can be suppressed sufficiently.

Usually, the reducing treatment temperature may advantageously be about 20 to 90° C. The reducing treatment temperature is preferably 25° C. or more, and preferably 80° C. or less. Usually, the reducing treatment time may be advantageously about 1 to 10 minutes. The reducing treatment time is preferably 2 minutes or more and preferably 5 minutes or less.

In the method of allowing a polymer having juts containing an organometal complex to contact a reducing gas to cause gas phase reduction, the reducing gas to be used is not particularly restricted providing it can reduce an organometal complex as the additive component into a metal or a metal oxide. Examples of the reducing gas include a hydrogen gas, diborane gas and the like.

The reducing treatment conditions such as the reducing treatment temperature, reducing treatment time and the like can be appropriately determined depending on the kind of a reducing gas to be used, the kind of an organometal complex as the additive component, and the like. For example, when a hydrogen gas is used as the reducing gas, it may be advantageous to effect treatment at temperatures of about 30 to 300° C. for about 5 to 60 minutes in a hydrogen gas flow.

The reducing treatment temperature may be appropriately determined taking the heat resistance of a polymer to be treated and a base material, reducing tendency of an organometal complex as the additive component, and the like into consideration.

The reducing treatment is usually carried out until an organometal complex present at least on the surface of a polymer is reduced approximately completely, and if necessary, the reducing treatment may be stopped on the way before complete reduction.

Thus obtained polymer having juts containing a metal and/or metal oxide can be used, for example, as a plating bed.

According to the present invention, it is possible for form a polymer having juts containing an additive component uniformly even on a base material having a fine irregular structure or a deep irregular structure. For example, according to the present invention, it is also possible to coat the inside of a fine reaction vessel having a diameter of decades μm called micro reactor.

Further, according to the present invention, it is possible to form a polymer having juts containing an additive component selectively on a part of an active energy ray exiting surface of a base material through which active energy ray has permeated. Therefore, it is possible to form a polymer having juts containing an additive component having a given fine pattern.

The polymer having juts of specific size of the present invention has, because of its peculiar form, an excellent water-repellant function. For example, it is possible to obtain a polymer having juts having extremely high water-repellency (super water-repellency) showing a contact angle with water of 90° or more, further, 100° or more. The contact angle with water is obtained by dropping one drop (15 μl) of pure water on the surface of a polymer membrane as a measuring subject at a measuring temperature of 20° C., and 10 seconds after dropping, measuring the contact angle of the water drop with the polymer membrane by observing the shape of the water drop by a microscope and the like.

The polymer (membrane) having such excellent water-repellency is used widely in window panes of automobiles, ships, aircrafts and the like, kitchen equipments, kitchen goods, bath equipments, lavatory equipments, mirrors, parabola antennae, other fields since it can repel water and oil and easily remove substances adhered to its surface.

The water-repellent function of the polymer having juts of the present invention is ascribable to its peculiar form. Namely, the polymer having juts of the present invention ha high water-repellency irrespective of the composition of the polymer. Therefore, according to the present invention, a polymer (membrane) having a composition suitable for its use can be endowed with an excellent water-repellent function.

The polymer having juts of the present invention has, because of its peculiar form, also an excellent sticky function. The polymer having juts of the present invention can be used in various fields as a sticky agent or a sticky sheet.

Further, the polymer having juts of the present invention has also an excellent adsorption function. The polymer having juts of the present invention can be used in various fields as an adsorption agent or a separation membrane (gas separation membrane and the like).

More specifically, the polymer having juts of the present invention can be used, utilizing its peculiar form, for detection and selection of DNA (DNA sensor) by appropriately selecting a polymerization precursor to be polymerized.

The polymer having juts of the present invention can also be applied to backlight guiding and scattering plates of displays by appropriately selecting a polymerization precursor to be polymerized.

Further, a metal membrane can also be formed on the polymer having juts of the present invention by known methods such as vapor deposition, plating and the like. The metal membrane is not limited to a metal single body, and may be an alloy, and may also be a metal oxide, metal nitride, metal carbide or the like.

A product obtained by forming a metal membrane or metal oxide membrane on the polymer haying juts of the present invention can be applied to an electron gun and the like. This electron guns can be used, for example, for a display and the like.

It is also possible that a metal membrane is peeled from the polymer having juts of the present invention by a known method, and resulting metal membrane is used as a mold for resin extrusion molding.

Further, according to the present invention, a polymer having juts can be formed uniformly even on a base material having a fine irregular structure or a deep irregular structure. For example, according to the present invention, it is also possible to coat the inside of a fine reaction vessel having a diameter of decades μm called micro reactor.

It is also possible to form a polymer having juts in which nano particles or other additives are uniformly dispersed, and for example, a colored membrane and a fluorescent membrane can also be formed.

The following examples will illustrate the present invention further in detail. The present invention is not limited to these examples.

EXAMPLE 1

Into a pressure-resistant reaction vessel having a content volume of 30 $cm^3$ having a quartz pressure-resistant window at the bottom of a concave portion provided on the inside wall of the reaction vessel was charged 0.872 g of polyether bis-maleimide acetate (manufactured by Dainippon Ink & Chemicals. Inc., MIA-200) as a polymerization precursor and 0.026 g of an organoplatinum complex [1,5-cyclooctadiene) dimethylplatinum (II)] as an additive component. Next, carbon dioxide was introduced into the reaction vessel at a bomb pressure of about 7 MPa while stirring the content of the reaction vessel, then, the temperature was raised to 35° C., further, carbon dioxide was introduced by a pressure pump so that the pressure in the reaction vessel was 30 MPa, to give supercritical condition. The charging concentration of the polymerization precursor polyether bismaleimide acetate was 3.5 wt %.

After stirring at a pressure of 30 MPa and a temperature of 35° C. for 1 hour, then, ultraviolet ray was irradiated from outside of the reaction vessel through the quartz pressure-resistant window into the reaction vessel at a dose of 10 J/cm$^2$ using an extra-high pressure mercury lamp equipped with quartz fiber as a light source. The conditions for irradiation with ultraviolet ray in this operation included an irradiation intensity of 33 mW/cm$^2$ and an irradiation time of 303 seconds. The wavelength of the irradiated ultraviolet ray was in a range from 254 to 436 nm. As a result, on the quartz pressure-resistant window, a polymer was formed having juts grown along the ultraviolet ray irradiation direction, namely, a direction vertical to the surface of the base material.

After irradiation with ultraviolet ray, carbon dioxide was discharged out of the reaction vessel gradually over a period of 120 minutes, to reduce the pressure in the reaction vessel down to atmospheric pressure.

By XMA (X-ray micro analyzer), the Pt surface of the resulting polymer having juts was analyzer. The SEM photograph (upper view) and XMA Pt image (lower view) of the resulting polymer having juts are shown in FIG. 3. In the lower view, XMA Pt image, in FIG. 3, a white portion shows Pt. As a result, it was found that, in the polymer having juts, the jut had high Pt concentration. That is, it was found that a polymer having juts containing an organoplatinum complex as an additive component was formed.

The resulting polymer having juts was calcined at 450° C. for 5 hours in air to metallize Pt. The SEM photograph of the resulting metal Pt membrane is shown in FIG. 4. The metal Pt membrane after calcination maintained the shape of the polymer having juts containing an organoplatinum complex before calcination, and it was porous.

EXAMPLE 2

Photopolymerization was carried out in the same manner as in Example 1 except that a mask pattern was pasted on the outside of the quartz pressure-resistant window and ultraviolet ray was irradiated via this mask pattern into the reaction vessel. As a result, a polymer having juts containing an organoplatinum complex was formed in which the mask pattern was transferred to a part on the quartz pressure-resistant window through which ultraviolet ray had been permeated.

EXAMPLE 3

Photopolymerization was carried out in the same manner as in Example 1 to obtain a polymer having juts containing an organoplatinum complex as an additive component.

The resulting polymer having juts was immersed in a 0.3% NaBH$_4$ aqueous solution at room temperature, to effect reduction treatment. About 2 minutes after immersion in a 0.3% NaBH$_4$ aqueous solution, metal platinum was deposited on the surface of the polymer having juts.

EXAMPLE 4

Photopolymerization was carried out in the same manner as in Example 1 except that the additive component was an organopalladium complex (palladium acetate), to obtain a polymer having juts containing an organopalladium complex as an additive component.

The resulting polymer having juts was immersed in a 0.3% NaBH$_4$ aqueous solution at room temperature, to effect reduction treatment. After washing with pure water, this polymer having juts was immersed in concentrated sulfuric acid (concentration: 50 mL/L) while stirring at 40° C. (313K) for 2 minutes, to effect catalyst activation for plating. This polymer having juts was removed out of concentrated sulfuric acid, and washed with pure water.

Next, into a 5 L beaker was placed an aqueous solution for electroless copper plating [mixed aqueous solution of OPC700A (concentration: 100 mL/L) manufactured by Okuno Seiyaku Kogyo and OPC700B (concentration: 100 mL/L) manufactured by Okuno Seiyaku Kogyo], and the above-mentioned polymer having juts was immersed in this aqueous solution for electroless copper plating while stirring and bubbling air into the vessel at room temperature for 60 minutes, to effect copper plating treatment. This polymer having juts was removed out of the aqueous solution for electroless copper plating and washed with pure water.

Subsequently, into a 5 L beaker was placed an aqueous solution for electroless copper plating [mixed aqueous solution of OPC copper T1 (concentration: 60 mL/L) manufactured by Okuno Seiyaku Kogyo, OPC copper T2 (concentration: 12 mL/L) manufactured by Okuno Seiyaku Kogyo and OPC copper T3 (concentration: 100 mL/L) manufactured by Okuno Seiyaku Kogyo], and the above-mentioned polymer having juts was immersed in this aqueous solution for electroless copper plating while stirring and bubbling air into the vessel at 60° C. (333K) for 120 minutes, to effect copper plating treatment. This polymer having juts was removed out of the aqueous solution for electroless copper plating and washed under ultrasonic in pure water for 5 minutes and in methanol for 10 minutes.

On the polymer having juts thus subjected to copper plating treatment, apparently, a uniform plating membrane with no swelling (thickness of plating layer; 2 μm) was formed on the surface of the polymer.

EXAMPLE 5

Into a pressure-resistant reaction vessel having a content volume of 30 cm$^3$ having a quartz pressure-resistant window at the bottom of a concave portion provided on the inside wall of the reaction vessel was charged 0.872 g of polyether bismaleimide acetate (manufactured by Dainippon Ink & Chemicals. Inc., MIA-200) as a polymerization precursor. Next, carbon dioxide was introduced into the reaction vessel at a bomb pressure of about 7 MPa while stirring the content of the reaction vessel, then, the temperature was raised to 35° C., further, carbon dioxide was introduced by a pressure pump so that the pressure in the reaction vessel was 30 MPa, to give supercritical condition. The charging concentration of the polymerization precursor polyether bismaleimide acetate was 3.5 wt %.

After stirring at a pressure of 30 MPa and a temperature of 35° C. for 1 hour, then, ultraviolet ray was irradiated from outside of the reaction vessel through the quartz pressure-resistant window into the reaction vessel at a dose of 1 J/cm$^2$ using an extra-high pressure mercury lamp equipped with quartz fiber as a light source. The conditions for irradiation with ultraviolet ray in this operation included an irradiation intensity of 33 mW/cm$^2$ and an irradiation time of 30.3 seconds. The wavelength of the irradiated ultraviolet ray was in a range from 254 to 436 nm. As a result, on the quartz pressure-resistant window, a polymer was formed having juts grown along the ultraviolet ray irradiation direction, namely, a direction vertical to the surface of the base material.

After irradiation with ultraviolet ray, carbon dioxide was discharged out of the reaction vessel gradually over a period of 120 minutes, to reduce the pressure in the reaction vessel down to atmospheric pressure. The SEM photograph of the resulting polymer having juts is shown in FIG. 5.

EXAMPLE 6

Photopolymerization was carried out in the same manner as in Example 5 except that the conditions for irradiation with ultraviolet ray included an irradiation intensity of 33 mW/cm$^2$, an irradiation time of 152 seconds and a dose of 5 J/cm$^2$. As a result, on the quartz pressure-resistant window, a polymer was formed having juts grown along the ultraviolet ray irradiation direction, namely, a direction vertical to the surface of the base material. The SEM photograph of the resulting polymer having juts is shown in FIG. 6.

EXAMPLE 7

Photopolymerization was carried out in the same manner as in Example 5 except that the conditions for irradiation with ultraviolet ray included an irradiation intensity of 33 mW/cm$^2$, an irradiation time of 303 seconds and a dose of 10 J/cm$^2$. As a result, on the quartz pressure-resistant window, a polymer was formed having juts grown along the ultraviolet ray irradiation direction, namely, a direction vertical to the surface of the base material. The SEM photograph of the resulting polymer having juts is shown in FIG. 7.

The contact angle with water of the resulting polymer having juts was measured by dropping one drop (15 μl) of pure water on the surface of a polymer membrane, and 10 seconds after dropping, measuring the contact angle of the water drop with the polymer membrane by observing the shape of the water drop, using a contact angle measuring apparatus CA-X150 manufactured by Kyowa Kaimen Kagaku under conditions of a temperature of 20° C. and a humidity of 55%. As a result, the contact angle with water of the resulting polymer having juts was 109.90. On the other hand, a continuous membrane obtained by polymerizing the same polymerization precursor (manufactured by Dainippon Ink & Chemicals. Inc., MIA-200) showed a contact angle with water of 90°. The polymer having juts of the present invention had higher water-repellency as compared with the continuous membrane of the same composition. The water-repellency of the resulting polymer having juts was equivalent to that of PTFE (polytetraflyoroethylene).

EXAMPLE 8

Photopolymerization was carried out in the same manner as in Example 7 except that a mask pattern was pasted on the outside of the quartz pressure-resistant window and ultraviolet ray was irradiated via this mask pattern into the reaction vessel. As a result, a polymer having juts was formed in which the mask pattern was transferred to a part on the quartz pressure-resistant window through which ultraviolet ray had been permeated.

REFERENCE EXAMPLE 1

Photopolymerization was carried out in the same manner as in Example 5 except that the conditions for irradiation with ultraviolet ray included an irradiation intensity of 33 mW/cm$^2$, an irradiation time of 1515 seconds and a dose of 50 J/cm$^2$. As a result, on the quartz pressure-resistant window, a polymer membrane was formed.

The SEM photograph of the resulting polymer membrane is shown in FIG. 8. The schematic sectional view of the resulting polymer membrane is shown in FIG. 9. 21 represents a base material (quartz pressure-resistant window) and 22 represents a polymer membrane. The polymer membrane obtained in Reference Example 1 showed progress of formation of a porous continuous membrane as compared with the polymer having juts obtained in Example 7.

In Examples 5 to 7, the size of the jut is as shown in FIGS. 5 to 7, and specifically, the height of the jut was about 0.5 to about 100 μm, the height of each jut was about 0.1 to about 10-fold of the each diameter.

INDUSTRIAL APPLICABILITY

According to the present invention, a polymer having juts having various physical properties and functions, and a membrane containing as the main component a metal and/or metal oxide having a specific fine structure, can be obtained. For example, application to various uses such a medical materials, pharmaceutical materials, separation function materials, sensor materials, catalyst materials and the like is expected. Further, realization of a novel functional structure is also expected.

Furthermore, according to the present invention, a polymer having juts of which height is larger as compared with its diameter and of which height is large can be obtained, and application to various used such as, for example, water-repellent materials, sticky materials, adsorption materials, separation function materials, sensor materials, display materials, medical materials and the like is expected. Further, realization of a novel functional structure is also expected.

The invention claimed is:

1. A process for producing a polymer, which comprises a step of carrying out photopolymerization of at least one photopolymerizable polymerization precursor containing a photocurable compound having two or more unsaturated bonds by irradiation with active energy ray in a supercritical fluid or subcritical fluid in the presence of at least one additive component comprising at least one organometal complex for adding a polymer function to produce a polymer having juts containing the additive component.

2. The process for producing a polymer according to claim 1, wherein the additive component is at least one organoplatinum complex.

3. The process for producing a polymer according to claim 1, wherein the supercritical fluid or subcritical fluid is supercritical carbon dioxide or subcritical carbon dioxide.

4. The process for producing a polymer according to claim 1, wherein the polymer having juts is formed on an active energy ray-permeable base material so disposed as to be exposed to the supercritical fluid or subcritical fluid.

5. The process for producing a polymer according to claim 4, wherein the active energy ray-permeable base material is so disposed that an incident surface for active energy ray of the base material is not exposed to the supercritical fluid nor subcritical fluid, and the exiting surface for active energy ray of the base material is exposed to the supercritical fluid or subcritical fluid, and, the photopolymerization of at least one photopolymerizable polymerization precursor containing the photocurable compound having two or more unsaturated bonds is carried out by irradiation with active energy ray while permeating through the active energy ray-permeable base material to form the polymer having juts on the exiting surface for active energy ray of the active energy ray-permeable base material.

6. The process for producing a polymer according to claim 5,
wherein the irradiation with active energy ray onto the active energy ray-permeable base material is conducted via a mask pattern to selectively form the polymer having juts on a part of the exiting surface for active energy ray of the active energy ray-permeable base material wherein the active energy ray was permeated through the part.

7. A polymer having juts, which has been functionalized by at least one organometal complex for adding a polymer function.

8. The polymer according to claim 7, wherein the height of juts is 0.1-fold or more of the diameter of the juts and the height of juts is 10 nm or more.

9. A structure containing the polymer having juts according to claim 7 on a base material.

10. A polymer having juts and comprising a metal and/or metal oxide, which was produced by reducing treatment of the polymer having juts according to claim 7.

11. A membrane containing a metal and/or metal oxide as a main component, which was produced by calcining treatment of the polymer having juts according to claim 7.

* * * * *

UNITED STATES PATENT AND TRADEMARK OFFICE
CERTIFICATE OF CORRECTION

PATENT NO.       : 7,649,027 B2
APPLICATION NO.  : 10/596826
DATED            : January 19, 2010
INVENTOR(S)      : Genji Imai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 793 days.

Signed and Sealed this

Twenty-eighth Day of December, 2010

David J. Kappos
*Director of the United States Patent and Trademark Office*